US012780264B2

(12) United States Patent
Kamogari

(10) Patent No.: US 12,780,264 B2
(45) Date of Patent: Nov. 3, 2026

(54) OPERATION DEVICE FOR VEHICLE, VEHICLE, OPERATION PROCESSING METHOD, AND NON-TRANSITORY MEMORY MEDIUM

(71) Applicant: TOYOTA JIDOSHA KABUSHIKI KAISHA, Toyota (JP)

(72) Inventor: Yuzuru Kamogari, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1 day.

(21) Appl. No.: 18/914,607

(22) Filed: Oct. 14, 2024

(65) Prior Publication Data

US 2025/0121858 A1 Apr. 17, 2025

(30) Foreign Application Priority Data

Oct. 17, 2023 (JP) ................................ 2023-179065

(51) Int. Cl.

*B60W 60/00* (2020.01)
*B60Q 3/70* (2017.01)
*B60R 16/00* (2006.01)
*B60W 50/08* (2020.01)

(52) U.S. Cl.

CPC ......... *B60W 60/0051* (2020.02); *B60Q 3/731* (2022.05); *B60R 16/005* (2013.01); *B60W 50/08* (2013.01)

(58) Field of Classification Search

CPC ... B60W 60/0051; B60W 50/08; B60Q 3/731; B60R 16/005; B60K 35/22; B60K 2360/175; B60K 2360/774

See application file for complete search history.

(56) References Cited

U.S. PATENT DOCUMENTS

| | | | | |
|---|---|---|---|---|
| 2016/0071418 | A1* | 3/2016 | Oshida ................ | B60W 30/165 701/23 |
| 2019/0019414 | A1* | 1/2019 | Guan ...................... | H04N 7/181 |
| 2019/0152525 | A1* | 5/2019 | Resch ................ | B62D 15/0255 |
| 2022/0066570 | A1 | 3/2022 | Takabatake et al. | |
| 2022/0234586 | A1* | 7/2022 | Oniwa ............ | B60W 30/18163 |
| 2023/0291403 | A1 | 9/2023 | Ito et al. | |

FOREIGN PATENT DOCUMENTS

| | | | |
|---|---|---|---|
| JP | 2017226343 | A | 12/2017 |
| JP | 2018079753 | A | 5/2018 |

* cited by examiner

*Primary Examiner* — Jason Holloway
*Assistant Examiner* — Godfrey Aleksander Maciorowski
(74) *Attorney, Agent, or Firm* — Hunton Andrews Kurth LLP

(57) ABSTRACT

The operation device is provided with operation switches at dedicated surfaces that are surfaces of interior components disposed laterally adjacent to the driver seat of the vehicle. The dedicated surfaces face to the sides of the interior components at which the driver seat is disposed. The operation switches are capable, in accordance with operation by a driver, of instructing control of at least one of an autonomous driving function and a driving assistance function of the vehicle.

11 Claims, 17 Drawing Sheets

FIG.7

| | AUTONOMOUS LANE CHANGE TO RIGHT LANE | | | AUTONOMOUS LANE CHANGE TO LEFT LANE | | |
|---|---|---|---|---|---|---|
| | AGREEMENT | INSTRUCTION | CANCELLATION | AGREEMENT | INSTRUCTION | CANCELLATION |
| PRECONDITION | FIRST SUGGESTION INFORMATION ACQUIRED | NO SUGGESTION INFORMATION ACQUIRED | AUTONOMOUS LANE CHANGE BEING IMPLEMENTED | SECOND SUGGESTION INFORMATION ACQUIRED | NO SUGGESTION INFORMATION ACQUIRED | AUTONOMOUS LANE CHANGE BEING IMPLEMENTED |
| OPERATION DETAILS | RIGHT SIDE OPERATION SWITCH PRESSED ONCE | RIGHT SIDE OPERATION SWITCH PRESSED ONCE | EITHER SWITCH SUCCESSIVELY PRESSED OR HELD PRESSED | LEFT SIDE OPERATION SWITCH PRESSED ONCE | LEFT SIDE OPERATION SWITCH PRESSED ONCE | EITHER SWITCH SUCCESSIVELY PRESSED OR HELD PRESSED |
| INPUTTED INFORMATION | AGREEMENT INFORMATION | START COMMAND INFORMATION | CANCELLATION INFORMATION | AGREEMENT INFORMATION | START COMMAND INFORMATION | CANCELLATION INFORMATION |

OPERATION DEVICE FOR VEHICLE, VEHICLE, OPERATION PROCESSING METHOD, AND NON-TRANSITORY MEMORY MEDIUM

CROSS-REFERENCE TO RELATED APPLICATION

This application is based on and claims priority under 35 USC 119 from Japanese Patent Application No. 2023-179065 filed on Oct. 17, 2023, the disclosure of which is incorporated by reference herein.

BACKGROUND

Technical Field

The present disclosure relates to an operation device for a vehicle, a vehicle, an operation processing method, and a non-transitory memory medium.

Related Art

For example, Japanese Patent Application Laid-Open (JP-A) No. 2018-079753 discloses an operation device for a vehicle with which a vehicle occupant may consistently and easily perform operations of a vehicle function.

In the operation device for a vehicle disclosed in JP-A No. 2018-079753, a function operation part that controls a function such as vehicle steering operation or the like is disposed in an armrest of a seat.

Therefore, operability of the function operation part of this operation device for a vehicle is higher in a state in which the vehicle occupant is resting an arm on the armrest. Because a driver who is the vehicle occupant gives instructions relating to running of the vehicle as appropriate, improving operability of an in-vehicle switch that can be operated from a driver seat is desirable.

SUMMARY

Accordingly, the present disclosure provides an operation device for a vehicle, a vehicle, an operation processing method, and a non-transitory memory medium that may improve operability of an in-vehicle switch that is operable from a driver seat of the vehicle.

An operation device for a vehicle according to a first aspect includes: an operation switch at a dedicated surface that is a surface of an interior component disposed laterally adjacent to a driver seat of the vehicle, the dedicated surface facing to a side of the interior component at which the driver seat is disposed, and the operation switch being capable of instructing control of at least one of an autonomous driving function or driving assistance function of the vehicle in accordance with operation by a driver.

In the operation device for a vehicle according to the first aspect, the operation switch that is capable of instructing control of the at least one of an autonomous driving function and a driving support function of the vehicle in accordance with operation by a driver is provided at the dedicated surface of the interior component that is disposed adjacent to the side of the driver seat of the vehicle. Thus, because the operation switch of this operation device for a vehicle is provided at the dedicated surface of the interior component that is disposed laterally adjacent to the driver seat, operability of an in-vehicle switch that is operable from the driver seat may be improved.

In the operation device for a vehicle according to a second aspect, in the first aspect, the interior component allows an arm of the driver to be rested thereon, and the operation switch is disposed at a position of a hand of the driver in a front-and-rear direction of the driver.

In the operation device for a vehicle according to the second aspect, an arm of a driver may be rested on the interior component. The operation switch is disposed at a position of the hand of the driver in the front-and-rear direction of the driver. Thus, because the operation switch according to this operation device for a vehicle is provided at the dedicated surface of the interior component that faces to the side at which the driver seat is disposed, the operation switch is easily pressed by a thumb of the hand in the state in which the driver is resting their arm on the interior component.

In the operation device for a vehicle according to a third aspect, in the first aspect or the second aspect, the interior component is a center console.

In the operation device for a vehicle according to the third aspect, the interior component is the center console. Therefore, in-vehicle switches provided at the center console of this operation device for a vehicle include at least the operation switch provided at the dedicated surface. Thus, space at the center console may be utilized efficiently.

In the operation device for a vehicle according to a fourth aspect, in any one of the first to third aspects, the operation switch includes: a first operation switch disposed at one vehicle width direction side of the driver seat, the first operation switch giving an instruction that causes the vehicle to move to the one vehicle width direction side in accordance with operation by the driver; and a second operation switch disposed at the other vehicle width direction side of the driver seat, the second operation switch giving an instruction that causes the vehicle to move to the other vehicle width direction side in accordance with operation by the driver.

In the operation device for a vehicle according to the fourth aspect, the direction in which the vehicle is to move corresponds with the arrangement by reference to the driver seat of the first operation switch and second operation switch in the vehicle width direction. More specifically, in this operation device for a vehicle, the first switch that is capable of instructing movement of the vehicle to the one vehicle width direction side is disposed at the one vehicle width direction side of the driver seat, and the second switch that is capable of instructing movement of the vehicle to the other vehicle width direction side is disposed at the other vehicle width direction side of the driver seat. Thus, according to this operation device for a vehicle, a driver in a seated state may give instructions to move the vehicle instinctively without confusion between the one side and the other side in the vehicle width direction.

In the operation device for a vehicle according to a fifth aspect, any one of the first to fourth aspects further includes a protruding portion disposed at a periphery of the operation switch, the protruding portion protruding to the side at which the driver seat is disposed relative to an operation surface of the operation switch.

In the operation device for a vehicle according to the fifth aspect, the protruding portion is provided that is disposed at the periphery of the operation switch and further to the side at which the driver is disposed than the operation surface of the operation switch. Therefore, when the protruding portion according to this operation device for a vehicle is provided, the driver accidentally operating the operation switch with an elbow or knee may be suppressed compared to operation with a finger. In addition, according to this operation device for a vehicle, the protrusion portion acts as a guide when the driver attempts to operate the operation switch by feel, and the operation switch may be operated easily without being looked at.

A vehicle according to a sixth aspect includes: the operation device for a vehicle according to the fourth aspect, a first lamp being provided at the first operation switch and a second lamp being provided at the second operation switch, the first lamp being capable of illuminating in a predetermined light-emitting mode and the second lamp being capable of illuminating in a predetermined light-emitting mode; memory; and a processor connected to the memory, wherein the processor is configured to: control the at least one of an autonomous driving function or driving assistance function of the vehicle; and illuminate the first lamp when a driving control unit suggests a movement to the one vehicle width direction side to the driver, and illuminate the second lamp when the driving control unit suggests a movement to the other vehicle width direction side to the driver.

In the vehicle according to the sixth aspect, in the operation device for a vehicle according to the fourth aspect, the first lamp is provided at the first operation switch and the second lamp is provided at the second operation switch. The driving control unit controls the at least one of an autonomous driving function and a driving assistance function of the vehicle. A lamp control unit illuminates the first lamp that is disposed at the one vehicle width direction side when suggesting movement to the one vehicle width direction side to the driver, and illuminates the second lamp that is disposed at the other vehicle width direction side when suggesting movement to the other vehicle width direction side to the driver. Therefore, according to this vehicle, the driver may be made aware of timings for operating the first operation switch and the second operation switch.

As described above, an operation device for a vehicle, a vehicle, an operation processing method, and a non-transitory memory medium according to the present disclosure may improve operability of an in-vehicle switch that is operable from a driver seat of the vehicle.

BRIEF DESCRIPTION OF THE DRAWINGS

Exemplary embodiments of the present invention will be described in detail based on the following figures, wherein:

FIG. 7 is an explanatory diagram describing agreement conditions, instruction conditions and cancellation conditions;

DETAILED DESCRIPTION

Below, a vehicle 10 according to present exemplary embodiments is described.

First Exemplary Embodiment

First, a first exemplary embodiment of the vehicle 10 according to the present exemplary embodiments is described.

Figure 1:
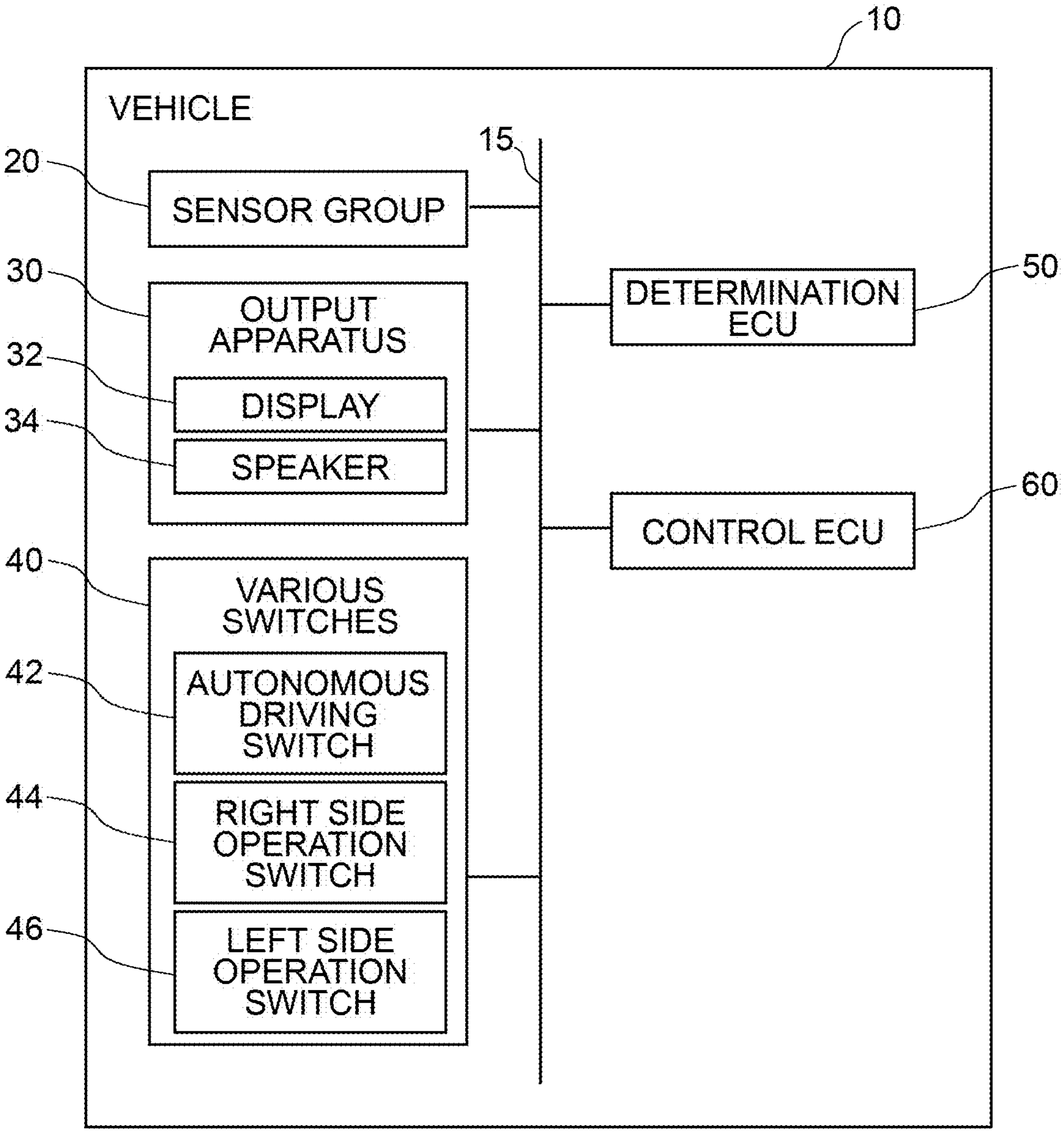
FIG. 1 is a first block diagram showing schematic structure of a vehicle.

FIG. 1 is a first block diagram showing schematic structure of the vehicle 10.

As shown in FIG. 1, the vehicle 10 is provided with a sensor group 20, an output apparatus 30, various switches 40, a determination electronic control unit (ECU) 50 and a control ECU 60. The sensor group 20, output apparatus 30, various switches 40, determination ECU 50 and control ECU 60 are connected to one another via an external bus (communications bus) 15.

The sensor group 20 is provided with sensors that detect states of the vehicle 10 and surrounding conditions such as, for example, 3-D Lidar, a millimeter-wave sensor, an infrared sensor, a turn signal sensor, an accelerator position sensor, a speed sensor, a steering sensor, an angular speed sensor, a global positioning system (GPS) sensor, a gyro sensor, an acceleration sensor and so forth. The sensor group 20 outputs detection results from these sensors to the determination ECU 50 and the control ECU 60.

The output apparatus 30 is provided with a display 32 and a speaker 34.

The display 32 is a head-up display (HUD). The display 32 displays action suggestions relating to functions of the vehicle 10 and images relating to descriptions of the functions, and the like.

The speaker 34 is provided at an instrument panel 14 (see FIG. 3), a center console 80 (see FIG. 3), or a dashboard or the like. The speaker 34 is a device for outputting action suggestions relating to functions of the vehicle 10, sounds relating to descriptions of the functions, and the like.

The various switches 40 include an autonomous driving switch 42, a right side operation switch 44 and a left side operation switch 46.

The autonomous driving switch 42 is an in-vehicle switch that may switch autonomous driving of the vehicle 10 on and off. The autonomous driving switch 42 is provided at a steering wheel 70 (see FIG. 3).

Figure 3:
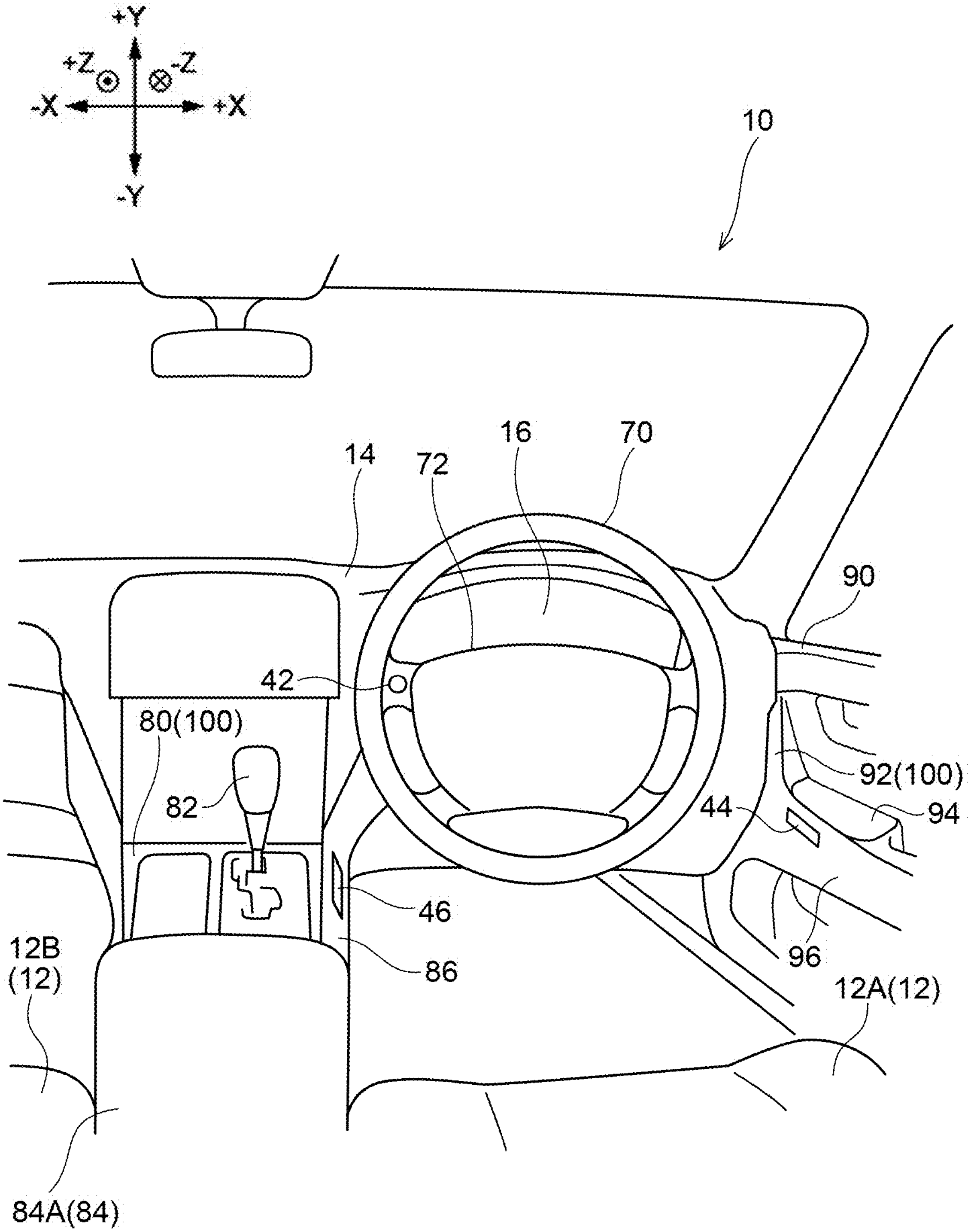
FIG. 3 is a first view of the interior of the vehicle seen from a driver seat.

The right side operation switch 44 is provided at a door trim 92 (see FIG. 3). The right side operation switch 44 is an in-vehicle switch that is capable of instructing the vehicle 10 to change lane to a right traffic lane during autonomous driving. The right side operation switch 44 is an example of an "operation switch" and a "first operation switch".

The left side operation switch 46 is provided at the center console 80. The left side operation switch 46 is an in-vehicle switch that is capable of instructing the vehicle 10 to change lane to a left traffic lane during autonomous driving. The left side operation switch 46 is an example of the "operation switch" and a "second operation switch".

The determination ECU 50 is an ECU that makes a determination as to whether or not to conduct a lane change of the vehicle 10 during autonomous driving.

The control ECU 60 is an advanced driver assistance system (ADAS) ECU that controls autonomous driving functions of the vehicle 10. For example, as autonomous driving functions, the vehicle 10 is provided with autonomous driving functions at autonomous driving level 2. In response to the autonomous driving switch 42 being turned on, the control ECU 60 causes the vehicle 10 to run autonomously by autonomous driving functions without associated driving operations by a driver. As an autonomous driving function, the vehicle 10 is provided with an autonomous lane change function that causes the vehicle 10 to change lane autonomously without associated driving operations by the driver. In response to agreement information or start command information from the determination ECU 50, which are described below, the control ECU 60 causes the vehicle 10 to change lanes autonomously by the autonomous lane change function without associated operations by the driver. The control ECU 60 is an example of a "driving control unit".

Figure 2:
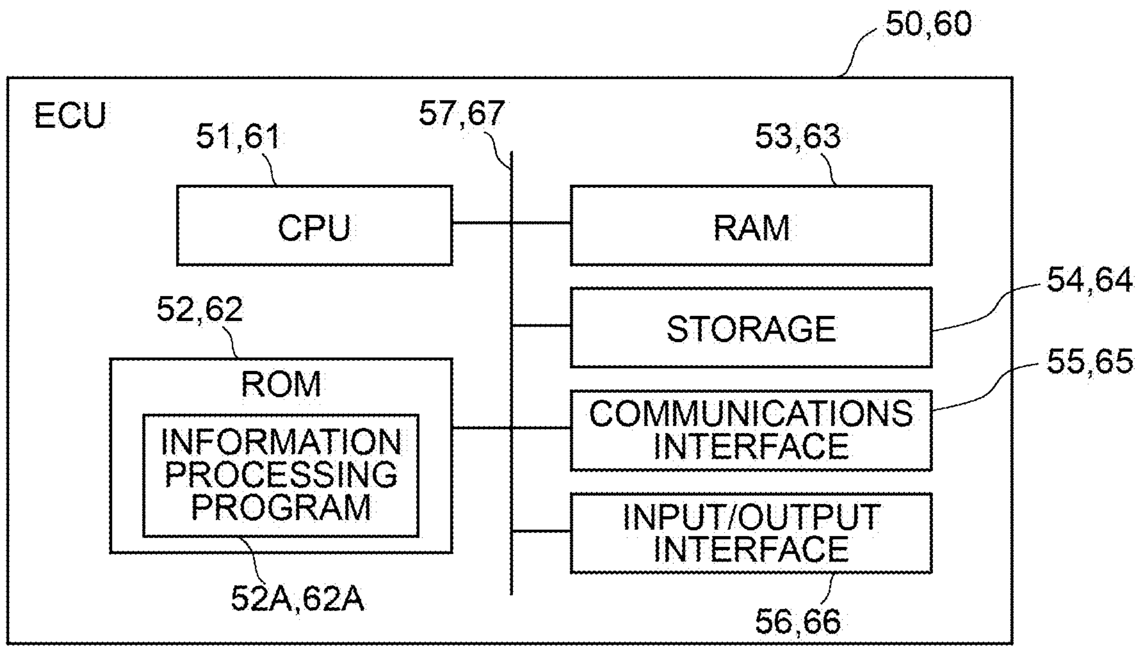
FIG. 2 is a block diagram showing schematic structure of a determination ECU and a control ECU.

FIG. 2 is a block diagram showing schematic structure of the determination ECU 50 and the control ECU 60. The determination ECU 50 and the control ECU 60 have basically common structures. Accordingly, the determination ECU 50 is taken as being representative and described.

As shown in FIG. 2, the determination ECU 50 includes a central processing unit (CPU) 51, read-only memory (ROM) 52, random access memory (RAM) 53, storage 54, a communications interface (I/F) 55, and an input/output interface 56. The CPU 51, ROM 52, RAM 53, storage 54, communications interface 55 and input/output interface 56 are connected with one another to be capable of communications via an internal bus 57.

The CPU 51 is a central arithmetic processing unit that executes various programs and controls respective parts. That is, the CPU 51 serving as a processor reads a program from the ROM 52 serving as memory and executes the program using the RAM 53 as a workspace. In the present exemplary embodiment, an information processing program 52A is stored at the ROM 52.

The ROM 52 stores various programs and various kinds of data. The RAM 53 serves as a workspace, temporarily storing programs and data.

The storage 54 is a NAND memory structured as an embedded multimedia card (eMMC), universal flash storage (UFS) or the like. The storage 54 and the CPU 51 are connected by an eMMC or UFS interface.

Components provided at the determination ECU 50, such as the ROM 52 and the storage 54, are desirably tamper-proofed media of a hardware security module (HSM) or the like.

The communications interface 55 is an interface for connecting with the control ECU 60 and the like. This interface employs a communications standard in accordance with Ethernet (registered trademark).

The input/output interface 56 is an interface for communicating with equipment mounted in the vehicle 10, such as the sensor group 20, the output apparatus 30, the various switches 40 and the like.

At the control ECU 60, functions of a CPU 61 that serves as a processor, ROM 62 and RAM 63 that serve as memory, storage 64, a communications interface 65, an input/output interface 66 and an internal bus 67 are similar to the above-described functions of the CPU 51, ROM 52, RAM 53, storage 54, communications interface 55, input/output interface 56 and internal bus 57 of the determination ECU 50. An information processing program 62A is stored in the ROM 62 of the control ECU 60.

FIG. 3 is a first view of the interior of the vehicle 10 seen from a driver seat. In FIG. 3, a vehicle width direction is indicated by "X", a vehicle vertical direction is indicated by "Y" and a vehicle front-and-rear direction is indicated by "Z". In FIG. 3, the right side in the vehicle width direction is indicated by +X and the left side by −X, the upper side in the vehicle vertical direction is indicated by +Y and the lower side by −Y, and the front side in the vehicle front-and-rear direction is indicated by +Z and the rear side by −Z. The vehicle front-and-rear direction is an example of a "front-and-rear direction of the driver", the right side in the vehicle width direction is an example of "one vehicle width direction side", and the left side in the vehicle width direction is an example of an "other vehicle width direction side".

As shown in FIG. 3, as an example, the vehicle 10 is a right-hand drive vehicle. Accordingly, a vehicle seat 12 at the right side of the drawing serves as a driver seat 12A and the vehicle seat 12 at the left side of the drawing serves as a front passenger seat 12B.

The steering wheel 70 is disposed to the front side of the driver seat 12A. The steering wheel 70 is supported via a steering column, which is not shown in the drawings, that supports a wheel pad 72. The steering wheel 70 is disposed at the rear side relative to the instrument panel 14.

The door trim 92, which covers a driver seat door 90 from a vehicle cabin inner side, is disposed adjacent to the right side of the driver seat 12A. The door trim 92 that is disposed adjacent to the right side of the driver seat 12A can be considered to be disposed adjacent to the driver seat 12A at a distance that allows contact by a hand, more specifically the fingers of the right hand, of a driver in a seated state sitting on the driver seat 12A. A projecting portion 94 that projects to the left side from the driver seat door 90 is provided in a middle region in the vehicle vertical direction of the door trim 92. The projecting portion 94 is formed with a substantially horizontal surface, and may be used as a door armrest on which the right arm of the driver may be rested.

A surface of the door trim 92 that extends in the vehicle front-and-rear direction and the vehicle vertical direction at the lower side of the projecting portion 94 is referred to as a door trim side face 96. The door trim side face 96 is a surface that faces to the side of the door trim 92 at which the driver seat 12A is disposed, specifically the left side. The door trim 92 is an example of an "interior component" and the door trim side face 96 is an example of a "dedicated surface".

The right side operation switch 44 is disposed at the door trim side face 96 at a position of the right hand of the driver in the vehicle front-and-rear direction. The right side operation switch 44 has a rectangular shape that is longer in the vehicle front-and-rear direction. The position of the right hand encompasses positions of right hands of people with body heights in a predetermined range. In the first exemplary embodiment, the right side operation switch 44 is disposed at a position of the thumb of the right hand of a person of size AM50 (the 50th percentile of American adult males) when the thumb is lowered in a state in which the person is seated on the driver seat 12A in a driving position and the right arm and right palm of the person are resting on the projecting portion 94. The right side operation switch 44 is disposed at the lower side relative to a lower end portion of the steering wheel 70.

The center console 80 is disposed adjacent to the left side of the driver seat 12A, specifically between the driver seat 12A and the front passenger seat 12B. The center console 80 that is disposed adjacent to the left side of the driver seat 12A can be considered to be disposed adjacent to the driver seat 12A at a distance that allows contact by a hand, more specifically the fingers of the left hand, of the driver in the seated state. A shift lever 82 is disposed at a front side region of the center console 80. A console box 84 is disposed at a rear side region of the center console 80. An upper face 84A of the console box 84 is formed with a substantially horizontal surface, and may be used as a center armrest on which the left arm of the driver may be rested.

A surface that extends from the front side region to the rear side region of the center console 80 and faces to the side of the center console 80 at which the driver seat 12A is disposed, specifically the right side, is referred to as a center console side face 86. The center console 80 is an example of the "interior component" and the center console side face 86 is an example of the "dedicated surface".

The left side operation switch 46 is disposed at the center console side face 86 at a position of the left hand of the driver in the vehicle front-and-rear direction. The left side operation switch 46 has a rectangular shape that is longer in the vehicle front-and-rear direction. The position of the left hand encompasses positions of left hands of people with body heights in the predetermined range. In the first exemplary embodiment, the left side operation switch 46 is disposed at a position of the thumb of the left hand of the person of size AM50 (the 50th percentile of American adult males) when the thumb is lowered in a state in which the person is seated on the driver seat 12A in the driving position and the left arm and left palm of the person are resting on the upper face 84A of the console box 84. The left side operation switch 46 is disposed at the lower side relative to the lower end portion of the steering wheel 70.

The door trim side face 96 and center console side face 86 of the present exemplary embodiment need not be substantially horizontal surfaces and are not particularly limited in shape. For example, the door trim side face 96 and the center console side face 86 may be vertical surfaces that are perpendicular to the vehicle width direction. Further, the door trim side face 96 may be a curved surface of the door trim 92 that is curved to the left side from a plane perpendicular to the vehicle width direction, and the center console side face 86 may be a curved surface of the center console 80 that is curved to the right side from a plane perpendicular to the vehicle width direction.

In the present exemplary embodiment as described above, the right side operation switch 44 is disposed at the door trim side face 96, the left side operation switch 46 is disposed at the center console side face 86, and an operation device for a vehicle 100 is constituted by the door trim 92 and the center console 80.

Now, flows of traffic lane changes (below referred to as autonomous lane changes) according to an autonomous lane change function are described using FIG. 4 and FIG. 5. The autonomous lane change is provided with a first pattern, which is conducted in accordance with a suggestion from the control ECU 60 being agreed to by the driver, and a second pattern, which is conducted in accordance with an instruction from the driver.

Figure 4:
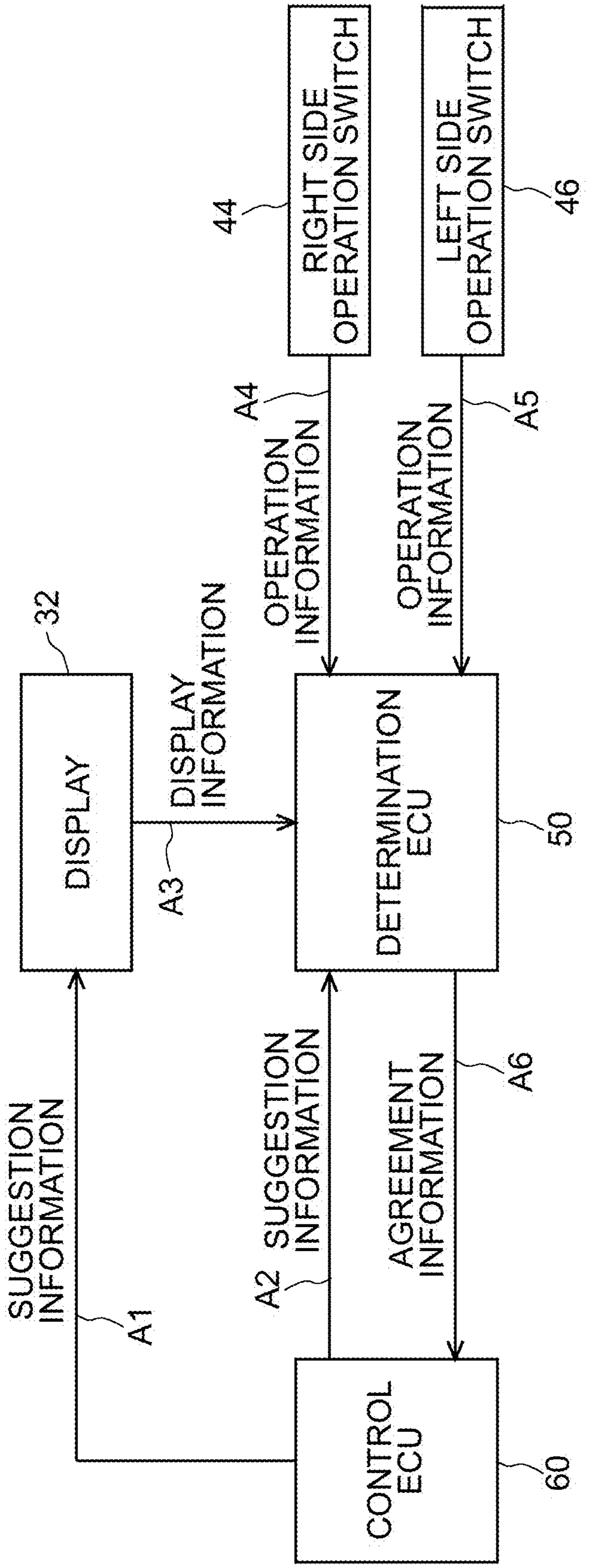
FIG. 4 is a block diagram describing a flow of a first pattern of an autonomous lane change.

FIG. 4 is a block diagram describing the flow of the first pattern of an autonomous lane change.

In FIG. 4, as indicated by arrow A1 and arrow A2, the control ECU 60 inputs suggestion information to the display 32 and the determination ECU 50. The suggestion information suggests an autonomous lane change when a first condition or a second condition is satisfied. In the first exemplary embodiment, the control ECU 60 inputs first suggestion information that suggests an autonomous lane change to a right lane when the first condition is satisfied, and inputs second suggestion information that suggests an autonomous lane change to a left lane when the second condition is satisfied. For example, when the vehicle 10 is running along a middle running lane of a high-speed road with three lanes in each direction, the control ECU 60 determines that the first condition is satisfied when a distance from a preceding vehicle running in that running lane is below a predetermined value and the speed of the vehicle 10 is below a predetermined value. When the vehicle 10 is running along the middle running lane of a high-speed road with three lanes in each direction, the control ECU 60 determines that the second condition is satisfied when a distance to an exit from the high-speed road according to a route navigation system is less than a predetermined value.

The display 32 acquiring the suggestion information displays a text message that is set in advance. For example, when the display 32 acquires the first suggestion information, the display 32 displays "System suggestion: Change lane to the right?", and when the display 32 acquires the second suggestion information, the display 32 displays "System suggestion: Change lane to the left?" As indicated by arrow A3, display information representing the text message being displayed at the display 32 is inputted to the determination ECU 50.

As indicated by arrow A4 and A5, operation details of operations by the driver on the right side operation switch 44 and left side operation switch 46 are inputted to the determination ECU 50 as operation information. As indicated by arrow A6, when an agreement condition that is described below is satisfied, the determination ECU 50 inputs agreement information agreeing to the autonomous lane change suggestion to the control ECU 60. The control ECU 60 acquiring this agreement information starts the autonomous lane change to the suggested lane.

Figure 5:
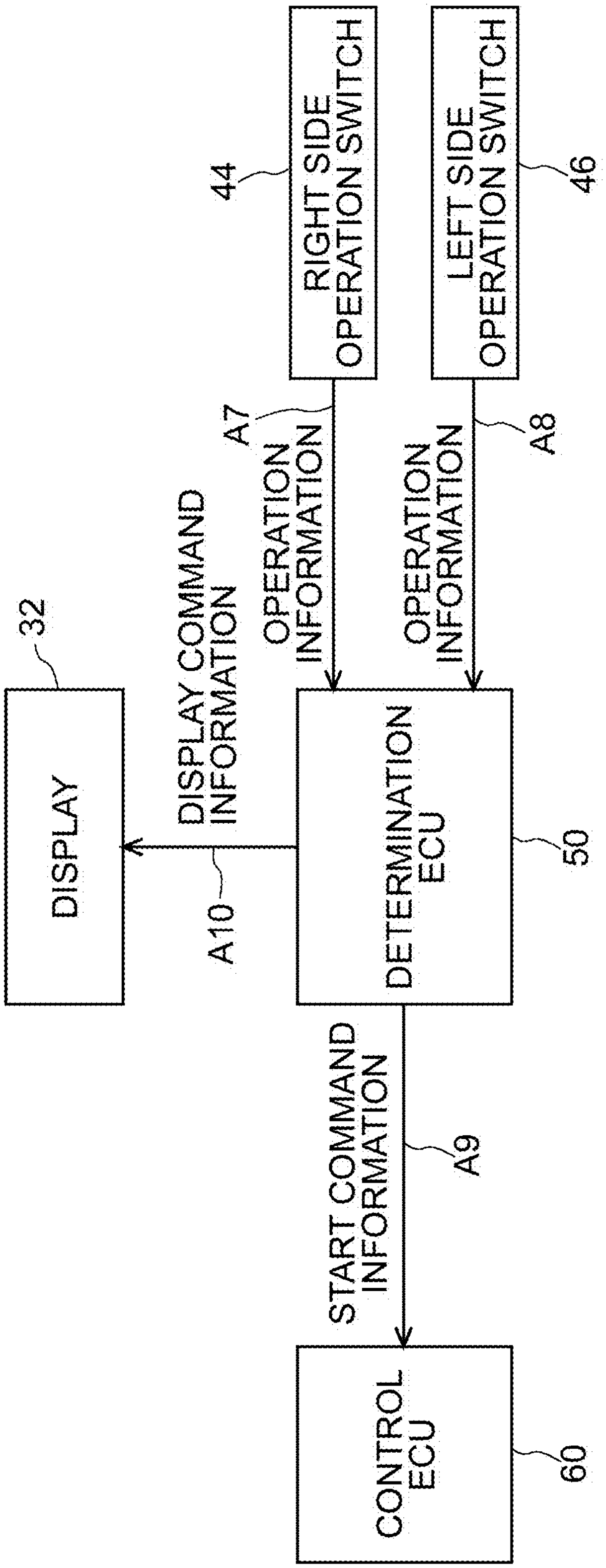
FIG. 5 is a block diagram describing a flow of a second pattern of an autonomous lane change.

FIG. 5 is a block diagram describing the flow of the second pattern of an autonomous lane change.

In FIG. 5, as indicated by arrow A7 and arrow A8, the determination ECU 50 acquires operation information entered from the right side operation switch 44 or the left side operation switch 46 in a state in which, in contrast to FIG. 4, the determination ECU 50 has not acquired suggestion information from the control ECU 60. As indicated by arrow A9, when an instruction condition that is described below is satisfied, the determination ECU 50 inputs start command information commanding the start of an autonomous lane change to the control ECU 60. As indicated by arrow A10, when the instruction condition is satisfied, the determination ECU 50 inputs display command information commanding a display relating to the start of the autonomous lane change to the display 32.

The display 32 acquiring the display command information displays a text message that is set in advance. For example, when the display 32 acquires display command information relating to the start of an autonomous lane change to a right lane, the display 32 displays "System acknowledgement: Changing lane to the right", and when the display 32 acquires display command information relating to the start of an autonomous lane change to a left lane, the display 32 displays "System acknowledgement: Changing lane to the left".

The control ECU 60 acquiring the start command information starts the autonomous lane change to the commanded lane.

Figure 6:
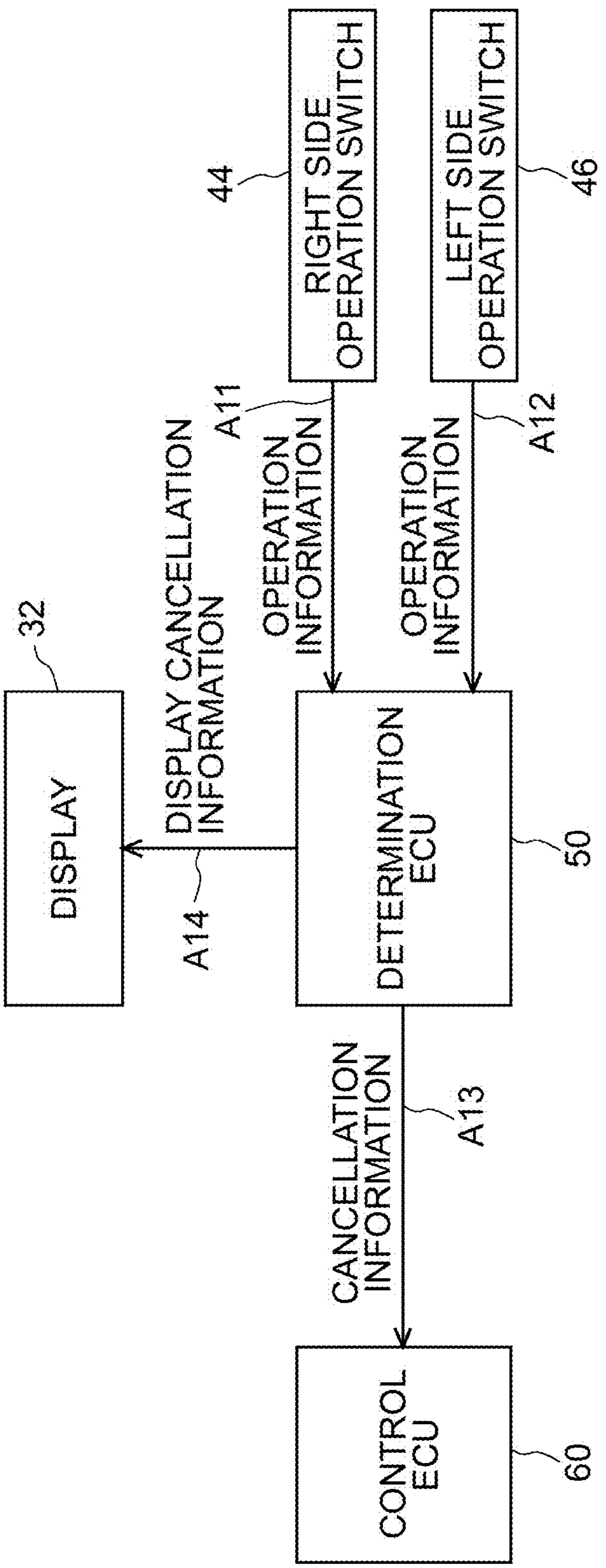
FIG. 6 is a block diagram describing a flow of cancelling an autonomous lane change during implementation.

Now, a flow of cancelling an autonomous lane change during implementation is described using FIG. 6. Below, it is presumed that the control ECU 60 has started an autonomous lane change to a right lane and the display 32 is displaying a message relating to the implementation of the autonomous lane change (for example, "Changing lane to the right").

In FIG. 6, as indicated by arrow A11 and arrow A12, the determination ECU 50 acquires operation information indicating that the right side operation switch 44 or the left side operation switch 46 has been successively pressed at least a predetermined number of times or held pressed for at least a predetermined duration. As described in detail below, operation details of an operation by the driver represented by the operation information differ from operation details acquired when the determination ECU 50 inputs the agreement information or start command information to the control ECU 60. As indicated by arrow A13, when a cancellation condition that is described below is satisfied, the determination ECU 50 inputs cancellation information commanding cancellation of the autonomous lane change to the control ECU 60. As indicated by arrow A14, when the cancellation condition is satisfied, the determination ECU 50 also inputs display cancellation information commanding a display relating to the cancellation of the autonomous lane change to the display 32.

The display 32 acquiring the display cancellation information displays a text message that is set in advance. For example, the display 32 displays "Cancellation acknowledgment: cancelling lane change".

The control ECU 60 acquiring the cancellation information cancels the autonomous lane change and causes the vehicle 10 to run in the running lane preceding the start of the autonomous lane change.

Now, agreement conditions, instruction conditions and cancellation conditions determined by the determination ECU 50 are described using FIG. 7.

FIG. 7 is an explanatory diagram describing the agreement conditions, instruction conditions and cancellation conditions.

When both a precondition and operation details of operation by the driver on the right side operation switch 44 or left side operation switch 46 are satisfied, the determination ECU 50 determines that one of the aforementioned conditions is satisfied and inputs predetermined information to the control ECU 60.

First, agreement conditions for inputting the agreement information to the control ECU 60 are described.

As shown in FIG. 7, in the case of an autonomous lane change to a right lane, the precondition for satisfying the agreement condition is that the determination ECU 50 has acquired the first suggestion information. In a state in which this precondition is satisfied, if the determination ECU 50 acquires operation information indicating that the right side operation switch 44 has been pressed once, the determination ECU 50 determines that the agreement condition is satisfied. Hence, the determination ECU 50 inputs the agreement information to the control ECU 60.

Alternatively, in the case of an autonomous lane change to a left lane, the precondition for satisfying the agreement condition is that the determination ECU 50 has acquired the second suggestion information. In a state in which this precondition is satisfied, if the determination ECU 50 acquires operation information indicating that the left side operation switch 46 has been pressed once, the determination ECU 50 determines that the agreement condition is satisfied. Hence, the determination ECU 50 inputs the agreement information to the control ECU 60.

Now, instruction conditions for inputting the start command information to the control ECU 60 are described.

In the case of an autonomous lane change to a right lane, the precondition for satisfying the instruction condition is that the determination ECU 50 has not acquired suggestion information. In the state in which this precondition is satisfied, if the determination ECU 50 acquires operation information indicating that the right side operation switch 44 has been pressed once, the determination ECU 50 determines that the instruction condition is satisfied. Hence, the determination ECU 50 inputs the start command information commanding the start of an autonomous lane change to the right lane to the control ECU 60.

Alternatively, in the case of an autonomous lane change to a left lane, the precondition for satisfying the instruction condition is that the determination ECU 50 has not acquired suggestion information. In the state in which this precondition is satisfied, if the determination ECU 50 acquires operation information indicating that the left side operation switch 46 has been pressed once, the determination ECU 50 determines that the instruction condition is satisfied. Hence, the determination ECU 50 inputs the start command information commanding the start of an autonomous lane change to the left lane to the control ECU 60.

Now, cancellation conditions for inputting the cancellation information to the control ECU 60 are described.

The precondition for satisfying a cancellation condition is that an autonomous lane change is being implemented, and is the same for the case of an autonomous lane change to a right lane and the case of an autonomous lane change to a left lane. For example, when the determination ECU 50 has inputted the agreement information or start command information to the control ECU 60, the determination ECU 50 determines that an autonomous lane change is being implemented. In a state in which this precondition is satisfied, if the determination ECU 50 acquires operation information indicating that the right side operation switch 44 or left side operation switch 46 has been successively pressed at least a predetermined number of times or held pressed for at least a predetermined duration, the determination ECU 50 determines that the cancellation condition is satisfied. Hence, the determination ECU 50 inputs the cancellation information to the control ECU 60.

Figure 8:
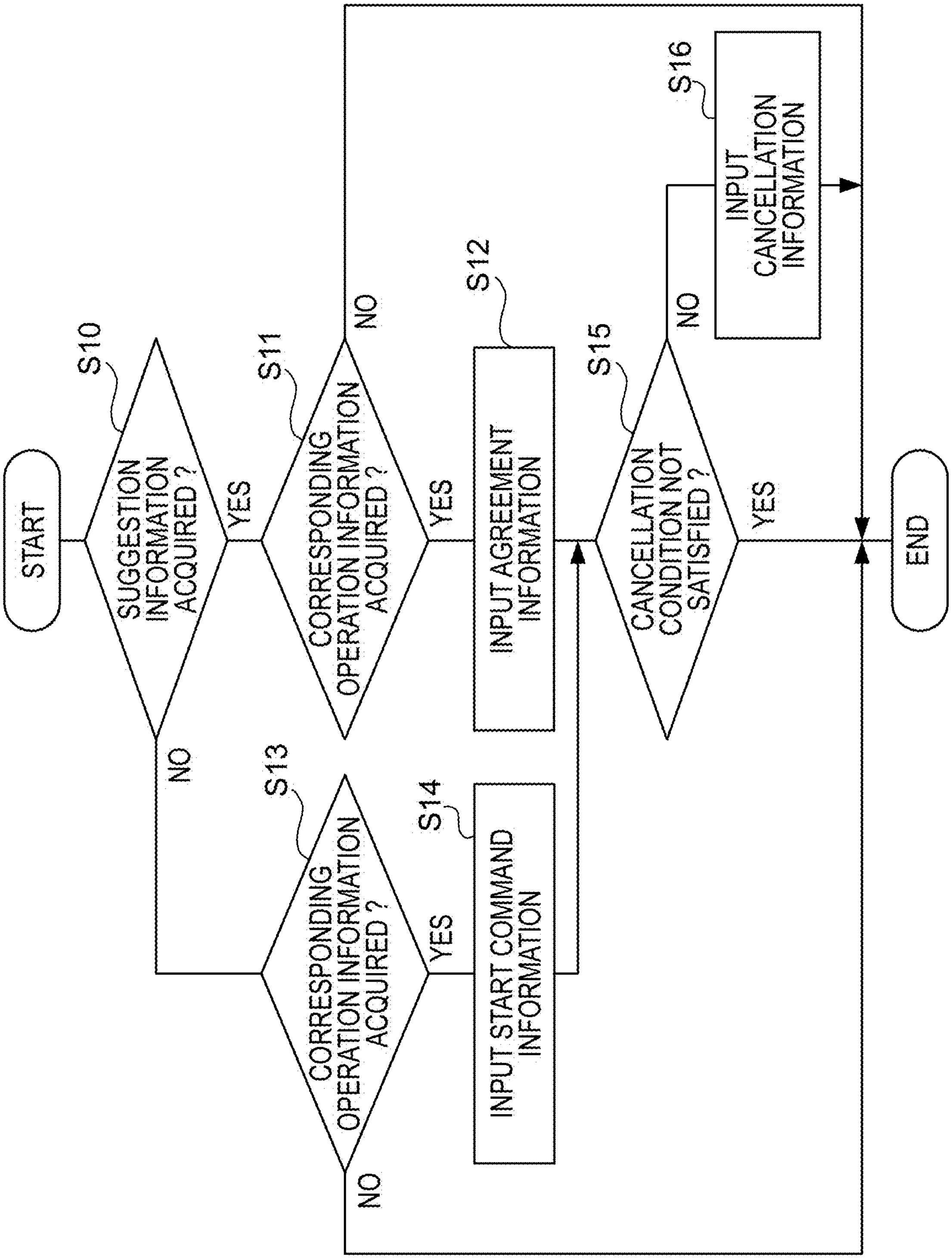
FIG. 8 is a first flowchart showing a flow of determination processing.

Now, a flow of processing by the determination ECU 50 is described using FIG. 8. FIG. 8 is a first flowchart showing a flow of determination processing that determines whether or not the determination ECU 50 inputs the agreement information or start command information to the control ECU 60. This determination processing is realized by the CPU 51 of the determination ECU 50 reading the information processing program 52A from the ROM 52, loading the information processing program 52A into the RAM 53 and executing the information processing program 52A. This determination processing is executed, for example, when the autonomous driving switch 42 is turned on and is automatically repeated each time a certain duration passes.

In step S10 shown in FIG. 8, the CPU 51 makes a determination as to whether suggestion information has been acquired. When the CPU 51 determines that suggestion information has been acquired (Yes in step S10), the CPU 51 proceeds to step S11. On the other hand, when the CPU 51 determines that no suggestion information has been acquired (No in step S10), the CPU 51 proceeds to step S13.

In step S11, the CPU 51 makes a determination as to whether operation information corresponding to the suggestion information acquired at step S10 has been acquired. When the CPU 51 determines that the corresponding operation information has been acquired (Yes in step S11), the CPU 51 determines that the agreement condition is satisfied and proceeds to step S12. On the other hand, when the CPU 51 determines that the corresponding operation information has not been acquired (No in step S11), the CPU 51 ends the determination processing. For example, when the suggestion information acquired at step S10 is the first suggestion information, the CPU 51 determines that the corresponding operation information has been acquired if the CPU 51 acquires operation information indicating that the right side operation switch 44 has been pressed once. Alternatively, when the suggestion information acquired at step S10 is the second suggestion information, the CPU 51 determines that the corresponding operation information has been acquired if the CPU 51 acquires operation information indicating that the left side operation switch 46 has been pressed once.

In step S12, the CPU 51 inputs the agreement information to the control ECU 60. Hence, the control ECU 60 acquiring the agreement information starts an autonomous lane change to the suggested lane. Then the CPU 51 proceeds to step S15.

In step S13, the CPU 51 makes a determination as to whether corresponding operation information has been acquired. When the CPU 51 determines that corresponding operation information has been acquired (Yes in step S13), the CPU 51 determines that the instruction condition is satisfied and proceeds to step S14. On the other hand, when the CPU 51 determines that no corresponding operation information has been acquired (No in step S13), the CPU 51 ends the determination processing. For example, the CPU 51 determines that corresponding operation information has been acquired if the CPU 51 acquires operation information indicating that the right side operation switch 44 or the left side operation switch 46 has been pressed once.

In step S14, the CPU 51 inputs the start command information to the control ECU 60. Hence, the control ECU 60 acquiring, for example, start command information commanding the start of an autonomous lane change to a right lane starts the autonomous lane change to the right lane. Alternatively, the control ECU 60 acquiring start command information commanding the start of an autonomous lane change to a left lane starts the autonomous lane change to the left lane. Then the CPU 51 proceeds to step S15.

In step S15, the CPU 51 makes a determination as to whether the cancellation condition is not satisfied. When the CPU 51 determines that the cancellation condition is not satisfied (Yes in step S15), the CPU 51 ends the determination processing. Alternatively, when the CPU 51 determines that the cancellation condition is satisfied (No in step S15), the CPU 51 proceeds to step S16.

In step S16, the CPU 51 inputs the cancellation information to the control ECU 60. Accordingly, the control ECU 60 acquiring the cancellation information cancels the autonomous lane change and causes the vehicle 10 to run in the running lane preceding the start of the autonomous lane change. The CPU 51 then ends the determination processing.

Figure 9:
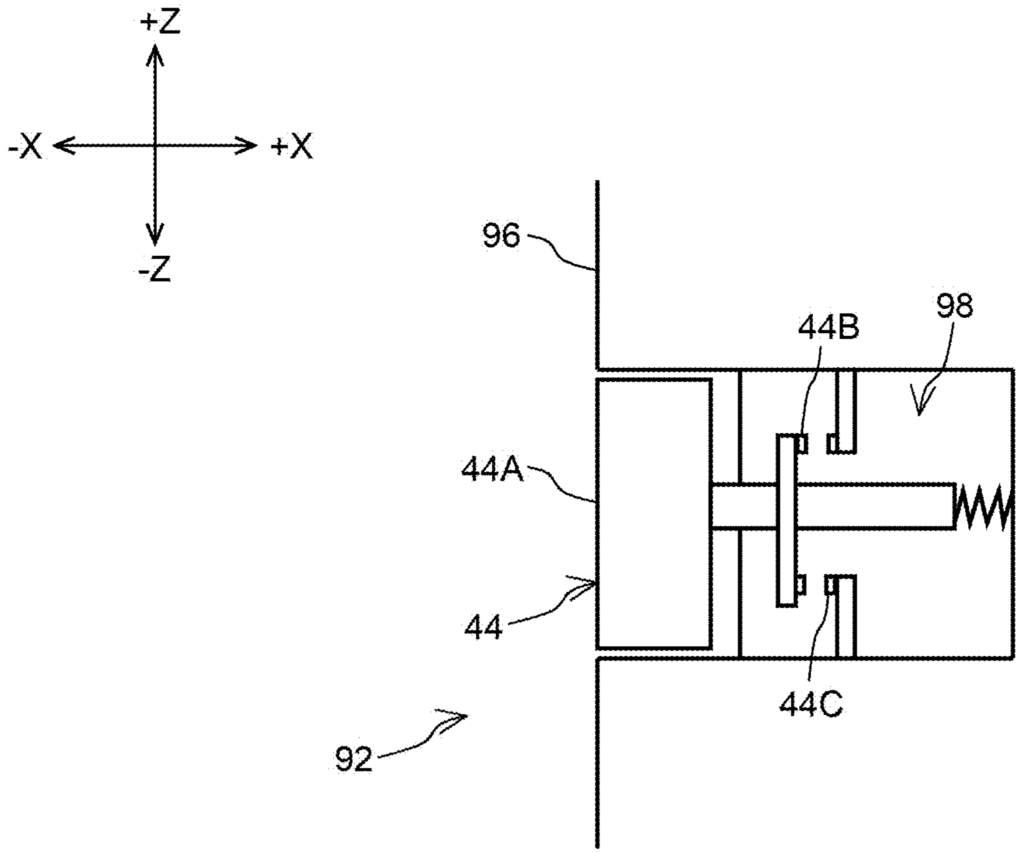
FIG. 9 is a schematic view describing structure of a right side operation switch.

Now, structure of the right side operation switch 44 is described using FIG. 9.

FIG. 9 is a schematic diagram describing the structure of the right side operation switch 44. The directions indicated by +Z, −Z, +X and −X in FIG. 9 are the same as in FIG. 3.

As shown in FIG. 9, the right side operation switch 44 is mounted at an aperture 98 formed in the door trim side face 96 of the door trim 92. The right side operation switch 44 is a publicly known automatic return-type push-button switch, with a structure that is pressed in to the right side when an operation surface 44A is pressed by a driver. As an example, the right side operation switch 44 is a Form A contact push-button switch.

FIG. 9 depicts a non-conducting state in which current does not pass between contact terminals of a movable contact 44B and a static contact 44C of the right side operation switch 44. The right side operation switch 44 in the non-conducting state has a structure in which the operation surface 44A does not protrude from the door trim side face 96. More specifically, in the first exemplary embodiment, the operation surface 44A of the right side operation switch 44 in the non-conducting state is coplanar with the door trim side face 96 in the vehicle front-and-rear direction.

According to the door trim 92 constituting the operation device for a vehicle 100 with the structure described above, because the operation surface 44A of the right side operation switch 44 in the non-conducting state does not protrude from the door trim side face 96, accidental operation of the right side operation switch 44 by the right elbow, right knee or the like of a driver may be suppressed.

The structure of the right side operation switch 44 is described above; the left side operation switch 46 has similar structure to the right side operation switch 44. That is, although not shown in the drawings, an operation surface of the left side operation switch 46 that is pressed by the driver is a structure that does not protrude from the center console side face 86 in the non-conducting state. More specifically, in the first exemplary embodiment the operation surface of the left side operation switch 46 in the non-conducting state is coplanar with the center console side face 86 in the vehicle front-and-rear direction.

As described above, the door trim 92 constituting the operation device for a vehicle 100 that is disposed adjacent to the right side of the driver seat 12A is equipped, at the door trim side face 96 facing to the side at which the driver seat 12A is disposed, specifically the left side, with the right side operation switch 44 that may instruct a change of lane of the vehicle 10 to a right lane. Meanwhile, the center console 80 constituting the operation device for a vehicle 100 that is disposed adjacent to the left side of the driver seat 12A is equipped, at the center console side face 86 facing to the side at which the driver seat 12A is disposed, specifically the right side, with the left side operation switch 46 that may instruct a change of lane of the vehicle 10 to a left lane.

According to the operation device for a vehicle 100 with the structure described above, because the right side operation switch 44 is provided at the door trim side face 96 and the left side operation switch 46 is provided at the center console side face 86, operability of in-vehicle switches that are operable from the driver seat 12A may be improved. More specifically, according to the operation device for a vehicle 100, because the right side operation switch 44 is provided at the door trim side face 96, the right side operation switch 44 is easy for a driver in a seated state to press with the thumb of the right hand and operability is excellent. Furthermore, according to the operation device for a vehicle 100, because the left side operation switch 46 is provided at the center console side face 86, the left side operation switch 46 is easy for the driver in the seated state to press with the thumb of the left hand and operability is excellent.

Moreover, according to the operation device for a vehicle 100, because the left side operation switch 46 at the center console 80 is provided at the center console side face 86 at which no other in-vehicle switches are provided, space at the center console 80 may be utilized effectively.

In the operation device for a vehicle 100, the directions of lane changes of the vehicle 10 correspond with the left and right arrangement of the right side operation switch 44 and left side operation switch 46 by reference to the driver seat 12A. More specifically, in the operation device for a vehicle 100, the right side operation switch 44 that is capable of instructing the vehicle 10 to change lane to a right lane is disposed at the right side of the driver seat 12A and the left side operation switch 46 that is capable of instructing the vehicle 10 to change lane to a left lane is disposed at the left side of the driver seat 12A. Thus, according to the operation device for a vehicle 100, a driver in a seated state may give instructions to change lanes instinctively without confusion between left and right.

The door trim 92 and center console 80 constituting the operation device for a vehicle 100 allow the arms of a driver to be rested thereon. More specifically, the projecting portion 94 of the door trim 92 acts as a door armrest that the right arm of the driver may be rested on and the upper face 84A of the center console 80 acts as a center armrest that the left arm of the driver may be rested on. The right side operation switch 44 is disposed in the door trim side face 96 at a position of the right hand of the driver in the vehicle front-and-rear direction, and the left side operation switch 46 is disposed in the center console side face 86 at a position of the left hand of the driver in the vehicle front-and-rear direction. Thus, according to the operation device for a vehicle 100, the right side operation switch 44 is provided at the side of the door trim 92 at which the driver seat 12A is disposed, specifically, at the door trim side face 96 that faces to the left side. Therefore, in a state in which the right arm is resting on the projecting portion 94, the driver can easily press the right side operation switch 44 with the thumb of their right hand. Meanwhile, according to the operation device for a vehicle 100, the left side operation switch 46 is provided at the side of the center console 80 at which the driver seat 12A is disposed, specifically, at the center console side face 86 that faces to the right side. Therefore, in a state in which the left arm is resting on the upper face 84A, the driver can easily press the left side operation switch 46 with the thumb of their left hand.

Second Exemplary Embodiment

Now, a second exemplary embodiment of the vehicle 10 according to the present exemplary embodiments is described, with descriptions of portions that duplicate the exemplary embodiment described above being omitted or simplified.

The door trim 92 of the second exemplary embodiment is provided with a protruding portion 95 (see FIG. 10A and FIG. 10B) that is disposed at the periphery of the right side operation switch 44. The protruding portion 95 protrudes to the side at which the driver is disposed relative to the operation surface 44A, specifically to the left side.

Figure 10A:
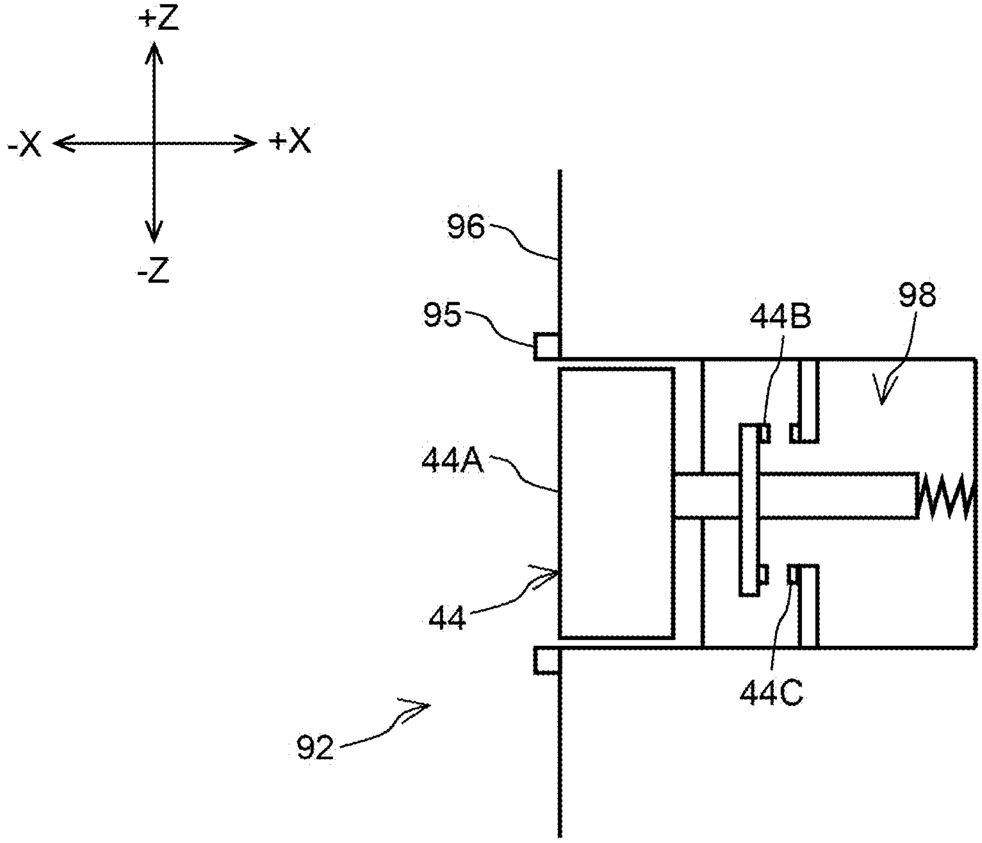
FIG. 10A is a first schematic view describing structure of a protruding portion.
Figure 10B:
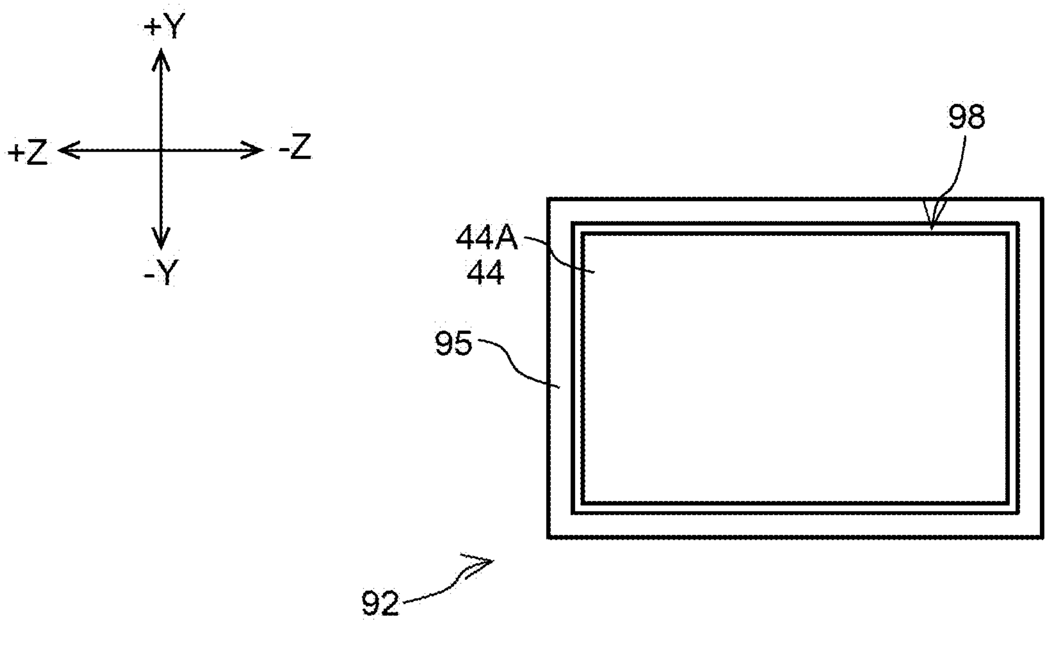
FIG. 10B is a second schematic view describing the structure of the protruding portion.

FIG. 10A is a first schematic view describing structure of the protruding portion 95, and FIG. 10B is a second schematic view describing the structure of the protruding portion 95. The directions indicated by +Z, −Z, +X and −X in FIG. 10A are the same as in FIG. 3, and the directions indicated by +Z, −Z, +Y and −Y in FIG. 10B are the same as in FIG. 3.

As shown in FIG. 10A and FIG. 10B, the protruding portion 95 is a frame member surrounding the periphery of the right side operation switch 44 in a rectangular shape. As shown in FIG. 10A, in the non-conducting state, the protruding portion 95 protrudes further to the left side than the operation surface 44A of the right side operation switch 44.

Dimensions of the operation surface 44A of the right side operation switch 44 are set to dimensions that allow a person of, for example, size AM50 (the 50th percentile of American adult males) to press the operation surface 44A with a finger but do not allow the person to press the operation surface 44A with the right elbow or right knee. According to the door trim 92 of the operation device for a vehicle 100 with this structure, because the protruding portion 95 is provided, even if the right elbow or right knee of the driver comes close to the right side operation switch 44, the right elbow or right knee makes contact with the protruding portion 95 and does not press the operation surface 44A. Therefore, because the protruding portion 95 is provided according to this door trim 92, the driver accidentally operating the right side operation switch 44 with the right knee, right elbow or the like may be suppressed compared to operation with a finger. In addition, according to this door trim 92, the protruding portion 95 acts as a guide when the driver attempts to press the right side operation switch 44 by feel, and the right side operation switch 44 may be pressed easily without being looked at.

Structure of the door trim 92 is described above; the center console 80 has a similar structure to the door trim 92. That is, although not shown in the drawings, the center console 80 is provided with a protruding portion that is disposed at the periphery of the left side operation switch 46 and protrudes to the side at which the driver is disposed relative to the operation surface of the left side operation switch 46, specifically to the right side.

Third Exemplary Embodiment

Now, a third exemplary embodiment of the vehicle 10 according to the present exemplary embodiments is described, with descriptions of portions that duplicate the exemplary embodiments described above being omitted or simplified.

Figure 11:
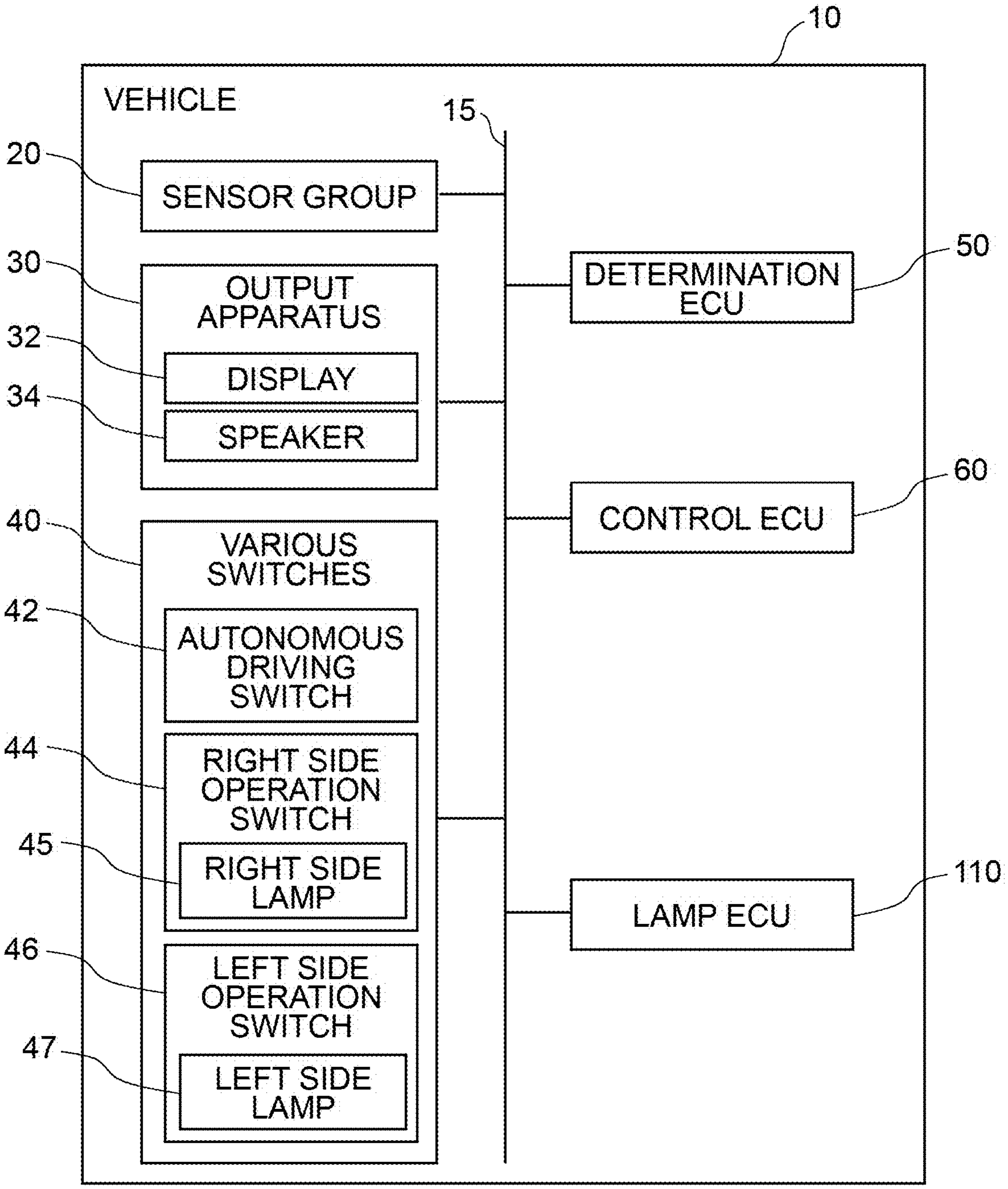
FIG. 11 is a second block diagram showing schematic structure of a vehicle.

FIG. 11 is a second block diagram showing schematic structure of the vehicle 10.

As shown in FIG. 11, the vehicle 10 is provided with the sensor group 20, the output apparatus 30, the various switches 40, the determination ECU 50, the control ECU 60 and a lamp ECU 110. The sensor group 20, output apparatus 30, various switches 40, determination ECU 50, control ECU 60 and lamp ECU 110 are connected to one another via the external bus (communications bus) 15.

In the third exemplary embodiment, a right side lamp 45 that may be illuminated in predetermined light-emitting states is provided at the right side operation switch 44. Also in the third exemplary embodiment, a left side lamp 47 that may be illuminated in predetermined light-emitting states is provided at the left side operation switch 46. The right side lamp 45 and left side lamp 47 are, for example, full-color light-emitting diodes (LEDs). The right side lamp 45 is an example of a “first lamp” and the left side lamp 47 is an example of a “second lamp”.

The lamp ECU 110 is an ECU that performs illumination control of the right side lamp 45 and left side lamp 47 in accordance with commands from the determination ECU 50. For example, as illumination control, the lamp ECU 110 controls illumination timings, illumination colors, illumination durations and so forth. The lamp ECU 110 is an example of a "lamp control unit".

This lamp ECU 110 causes the right side lamp 45 to illuminate when the control ECU 60 suggests an autonomous lane change to a right lane to a driver, and causes the left side lamp 47 to illuminate when the control ECU 60 suggests an autonomous lane change to a left lane to the driver. This is described in more detail below.

Figure 12:
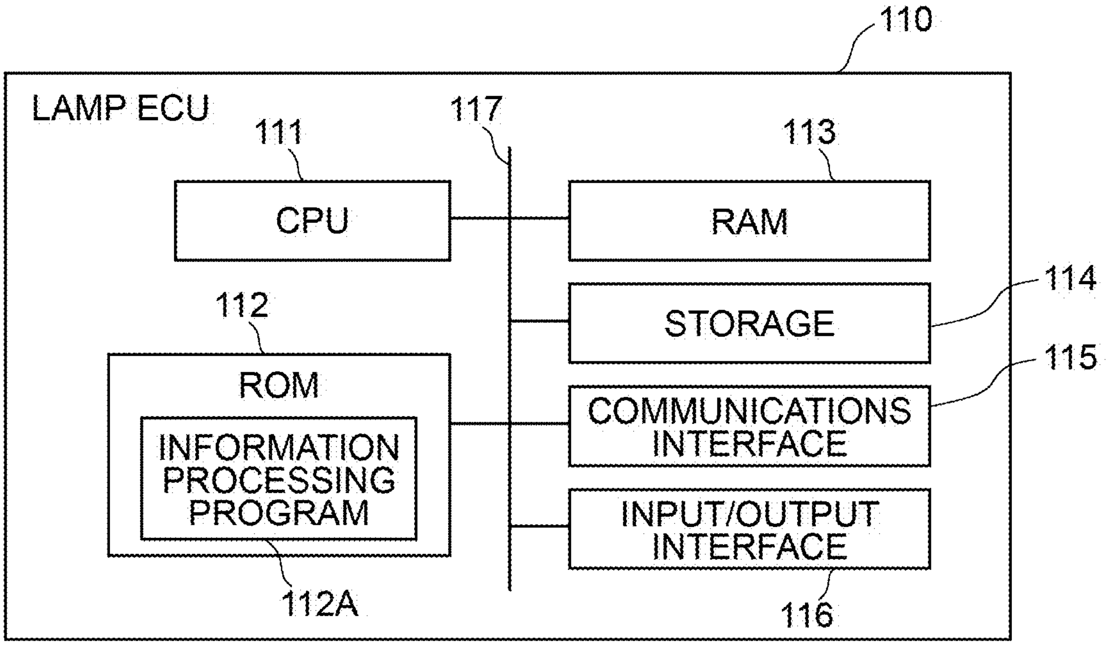
FIG. 12 is a block diagram showing schematic structure of a lamp ECU.

FIG. 12 is a block diagram showing schematic structure of the lamp ECU 110.

As shown in FIG. 12, the lamp ECU 110 includes a CPU 111, ROM 112, RAM 113, storage 114, a communications interface 115 and an input/output interface 116. The CPU 111, ROM 112, RAM 113, storage 114, communications interface 115 and input/output interface 116 are connected with one another to be capable of communications via an internal bus 117.

At the lamp ECU 110, functions of the CPU 111 that serves as a processor, ROM 112 and RAM 113 that serve as memory, storage 114, communications interface 115, input/output interface 116 and internal bus 117 are similar to the above-described functions of the CPU 51, ROM 52, RAM 53, storage 54, communications interface 55, input/output interface 56 and internal bus 57 of the determination ECU 50. An information processing program 112A is stored in the ROM 112 of the lamp ECU 110.

Figure 13:
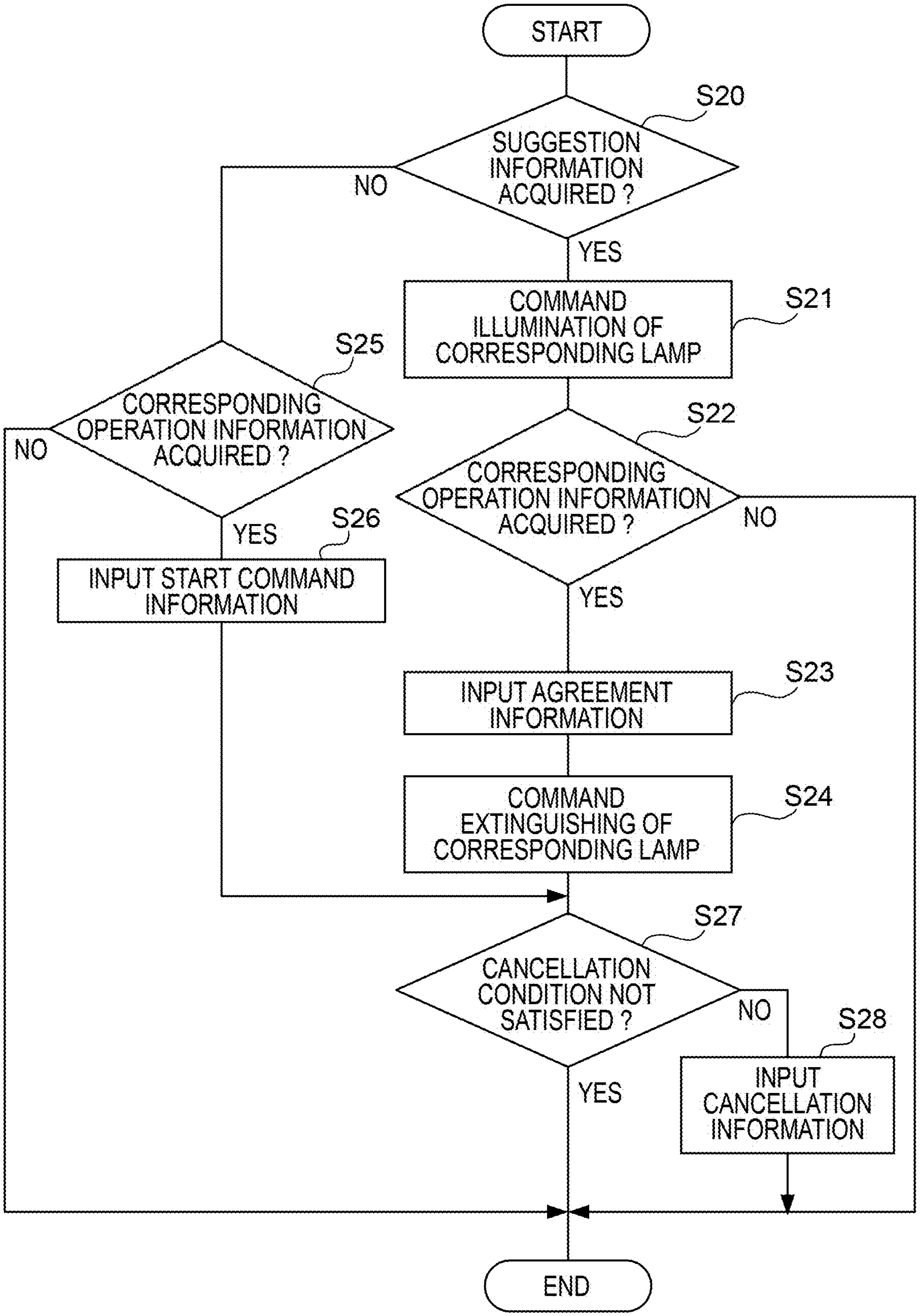
FIG. 13 is a second flowchart showing a flow of determination processing.

Now, a flow of processing by the determination ECU 50 is described using FIG. 13.

FIG. 13 is a second flowchart showing a flow of determination processing that determines whether or not the determination ECU 50 has inputted agreement information or start command information to the control ECU 60.

In step S20 shown in FIG. 13, the CPU 51 makes a determination as to whether suggestion information has been acquired. When the CPU 51 determines that suggestion information has been acquired (Yes in step S20), the CPU 51 proceeds to step S21. On the other hand, when the CPU 51 determines that no suggestion information has been acquired (No in step S20), the CPU 51 proceeds to step S25.

In step S21, the CPU 51 sends a command to the lamp ECU 110 to illuminate a lamp corresponding to the suggestion information acquired at step S20. Then the CPU 51 proceeds to step S22. For example, when the suggestion information acquired at step S20 is the first suggestion information, the CPU 51 sends a command to the lamp ECU 110 to illuminate the right side lamp 45 as the corresponding lamp. Alternatively, when the suggestion information acquired at step S20 is the second suggestion information, the CPU 51 sends a command to the lamp ECU 110 to illuminate the left side lamp 47 as the corresponding lamp.

In step S22, the CPU 51 makes a determination as to whether operation information corresponding to the suggestion information acquired at step S20 has been acquired. When the CPU 51 determines that the corresponding operation information has been acquired (Yes in step S22), the CPU 51 determines that the agreement condition is satisfied and proceeds to step S23. On the other hand, when the CPU 51 determines that no corresponding operation information has been acquired (No in step S22), the CPU 51 ends the determination processing.

In step S23, the CPU 51 inputs the agreement information to the control ECU 60. Then the CPU 51 proceeds to step S24.

In step S24, the CPU 51 sends a command to the lamp ECU 110 to extinguish the lamp whose illumination was commanded in step S21. Then the CPU 51 proceeds to step S27.

In step S25, the CPU 51 makes a determination as to whether corresponding operation information has been acquired. When the CPU 51 determines that the corresponding operation information has been acquired (Yes in step S25), the CPU 51 determines that the instruction condition is satisfied and proceeds to step S26. On the other hand, when the CPU 51 determines that no corresponding operation information has been acquired (No in step S25), the CPU 51 ends the determination processing.

In step S26, the CPU 51 inputs the start command information to the control ECU 60. Then the CPU 51 proceeds to step S27.

In step S27, the CPU 51 makes a determination as to whether the cancellation condition is not satisfied. When the CPU 51 determines that the cancellation condition is not satisfied (Yes in step S27), the CPU 51 ends the determination processing. Alternatively, when the CPU 51 determines that the cancellation condition is satisfied (No in step S27), the CPU 51 proceeds to step S28.

In step S28, the CPU 51 inputs the cancellation information to the control ECU 60. The CPU 51 then ends the determination processing.

In the vehicle 10 as described above, the lamp ECU 110 performs control so as to illuminate the right side lamp 45 when the control ECU 60 suggests an autonomous lane change to a right lane to a driver and illuminate the left side lamp 47 when the control ECU 60 suggests an autonomous lane change to a left lane to the driver. Therefore, according to the vehicle 10, the driver may be made aware of timings for operating the right side operation switch 44 and the left side operation switch 46.

Alternatives

The right side operation switch 44 and left side operation switch 46 of the exemplary embodiments described above are not limited to being in-vehicle switches that are capable, in accordance with operation by a driver, of instructing control of the autonomous lane change function, which is an autonomous driving function of the vehicle 10. For example, the right side operation switch 44 and the left side operation switch 46 may be in-vehicle switches that are capable of instructing control of a driving assistance function of the vehicle 10 in accordance with operation by a driver, and may be in-vehicle switches that are capable of instructing control of an autonomous driving function and a driving assistance function of the vehicle 10 in accordance with operation by a driver. In these situations, the control ECU 60 controls at least one of an autonomous driving function and a driving assistance function of the vehicle 10.

In the exemplary embodiments described above, the autonomous driving function of the vehicle 10 is not limited to being the autonomous lane change function. For example, the autonomous driving function may be an autonomous parking function that autonomously parks the vehicle 10 without associated driving operations by a driver, or the like. In this situation, the right side operation switch 44 may be an in-vehicle switch that is capable of instructing parking in a parking space to the rear-right of the vehicle 10 and the left side operation switch 46 may be an in-vehicle switch that is capable of instructing parking in a parking space to the rear-left of the vehicle 10.

Similarly, the driving support function mentioned above is not particularly limited. For example, a driving support function may be adaptive cruise control (ACC). In this situation, the right side operation switch 44 may be an in-vehicle switch that is capable of instructing an increase in a speed setting of ACC, and the left side operation switch 46 may be an in-vehicle switch that is capable of instructing a decrease in the speed setting of ACC. Further, the right side operation switch 44 may be an in-vehicle switch that is capable of instructing an increase in a specified distance between vehicles in ACC, and the left side operation switch 46 may be an in-vehicle switch that is capable of instructing a decrease in the specified distance between vehicles in ACC. Further still, the right side operation switch 44 may be an in-vehicle switch that is capable of instructing a running position tending to the right in the same running lane in ACC, and the left side operation switch 46 may be an in-vehicle switch that is capable of instructing a running position tending to the left in the same running lane in ACC. The functions assigned to the right side operation switch 44 and left side operation switch 46 may be these functions but reversed between left and right.

In the exemplary embodiments described above, the operation device for a vehicle 100 is constituted by the door trim 92 and the center console 80, but the operation device for a vehicle 100 is not limited thus. For example, the operation device for a vehicle 100 may be at one of the door trim 92 and the center console 80. In this situation, the operation device for a vehicle 100 may have a structure in which only the right side operation switch 44 that may instruct a lane change of the vehicle 10 to a right lane in accordance with operation by a driver is provided at the door trim side face 96 of the door trim 92. Alternatively, the operation device for a vehicle 100 may have a structure in which only the left side operation switch 46 that may instruct a lane change of the vehicle 10 to a left lane in accordance with operation by a driver is provided at the center console side face 86 of the center console 80.

The vehicle 10 of the exemplary embodiments described above is not limited to being a right-hand drive vehicle. For example, the vehicle 10 may be a left-hand drive vehicle. In this situation, a door trim that is disposed adjacent to the left side of the driver seat constitutes the operation device for a vehicle 100 and the vehicle 10 is provided with the left side operation switch 46, which may instruct a lane change of the vehicle 10 to a left lane in accordance with operation by a driver, at the side of the door trim at which the driver seat is disposed, specifically at a surface of the door trim that faces to the right side. The center console 80 that is disposed adjacent to the right side of the driver seat also constitutes the operation device for a vehicle 100 and the vehicle 10 is provided with the right side operation switch 44, which may instruct a lane change of the vehicle 10 to a right lane, at the side of the center console 80 at which the driver seat is disposed, specifically at a surface of the center console 80 that faces to the left side.

In the exemplary embodiments described above, the display 32 is not limited to being an HUD. For example, the display 32 may be a liquid crystal monitor provided at the instrument panel 14, a meter panel 16 (see FIG. 3) or the like.

In the exemplary embodiments described above, shapes of the right side operation switch 44 and the left side operation switch 46 are not limited to being rectangular shapes that are longer in the vehicle front-and-rear direction. For example, the shapes of the right side operation switch 44 and left side operation switch 46 may be circular shapes and may be elliptical shapes.

In the exemplary embodiments described above, the right side operation switch 44 is disposed at a position of the door trim side face 96 that a driver sitting on the driver seat 12A may operate with the thumb of their right hand in a state in which the driver seat 12A is in the driving position and the driver is resting their right arm and right palm on the projecting portion 94. Meanwhile, the left side operation switch 46 is disposed at a position of the center console side face 86 that the driver sitting on the driver seat 12A may operate with the thumb of their left hand in a state in which the driver seat 12A is in the driving position and the driver is resting their left arm and left palm on the upper face 84A of the console box 84.

However, positions of the right side operation switch 44 and left side operation switch 46 at the door trim side face 96 and center console side face 86 are not limited to the positions described above. For example, the right side operation switch 44 may be disposed at a position of the door trim side face 96 that a driver sitting on the driver seat 12A may operate with the thumb of their right hand in a state in which the driver seat 12A is in a relaxing position that is lowered to the rear side from the driving position. Similarly, the left side operation switch 46 may be disposed at a position of the center console side face 86 that a driver sitting on the driver seat 12A may operate with the thumb of their left hand in a state in which the driver seat 12A is in the relaxing position. When the right side operation switch 44 and left side operation switch 46 are disposed at the positions described above, operability of the right side operation switch 44 and left side operation switch 46 when the vehicle 10 is driving autonomously and the driver is in a hands-off state may be improved.

Further, the right side operation switch 44 may be disposed at a position of the door trim side face 96 that the driver sitting on the driver seat 12A may operate with the thumb of their right hand in a state in which the driver seat 12A is in either the driving position or the relaxing position. Similarly, the left side operation switch 46 may be disposed at a position of the center console side face 86 that the driver sitting on the driver seat 12A may operate with the thumb of their left hand in a state in which the driver seat 12A is in either the driving position or the relaxing position. These structures are described using FIG. 14.

Figure 14:
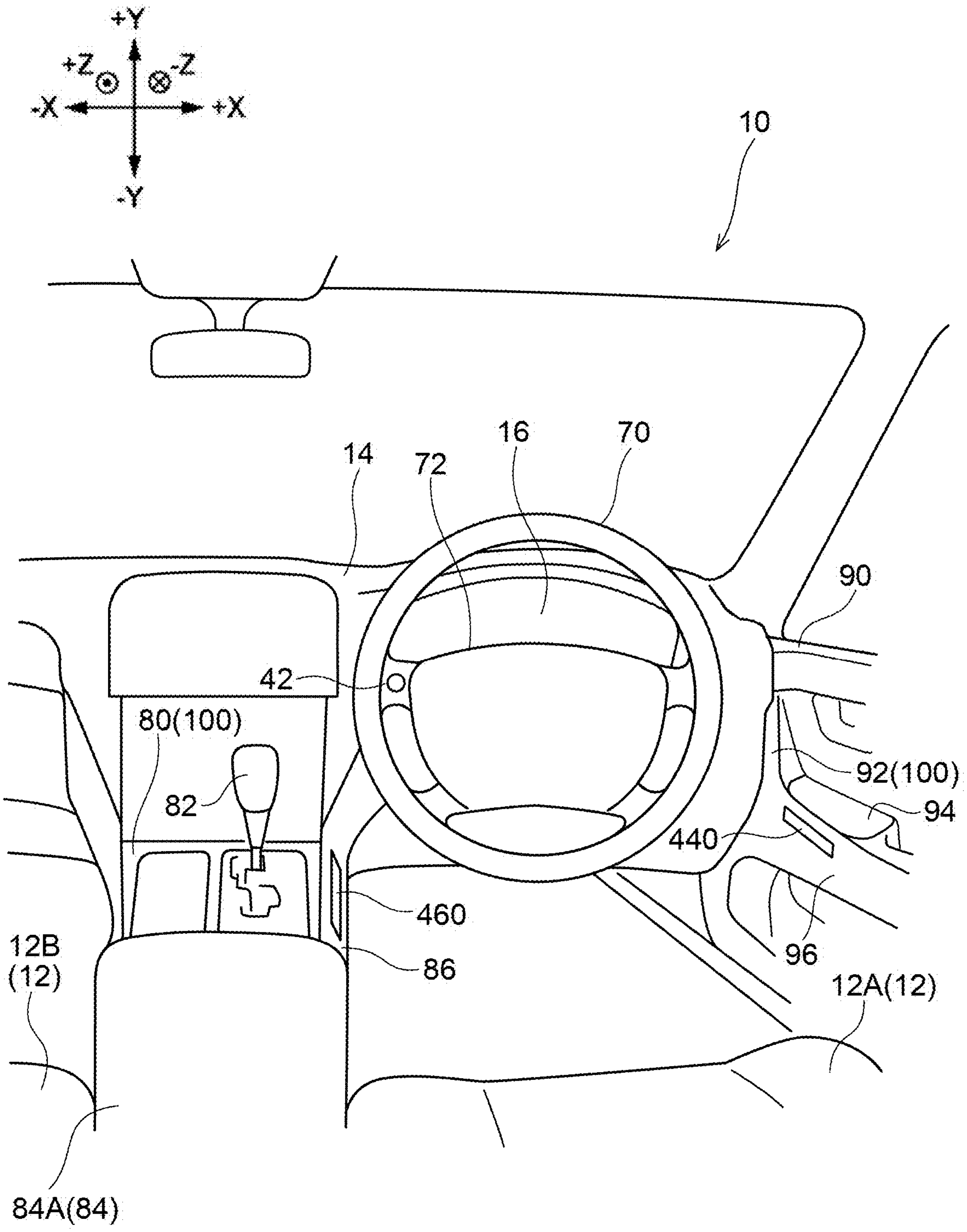
FIG. 14 is a second view of the interior of the vehicle seen from the driver seat.

FIG. 14 is a second view of the interior of the vehicle 10 seen from the driver seat.

As shown in FIG. 14, a right side operation switch 440 is disposed at the door trim side face 96 at a position of the right hand of the driver in the vehicle front-and-rear direction. The right side operation switch 440 is longer in the front vehicle front-and-rear direction than the right side operation switch 44 illustrated in FIG. 3. For example, the right side operation switch 440 is disposed at a position that may be touched by the thumb of the right hand of a person of size AM50 (the 50th percentile of American adult males) when the person is seated on the driver seat 12A in any of the driving position and the relaxing position. The right side operation switch 440 is an example of the "operation switch" and the "first operation switch".

Meanwhile, a left side operation switch 460 is disposed at the center console side face 86 at a position of the left hand of the driver in the vehicle front-and-rear direction. The left side operation switch 460 is longer in the front vehicle front-and-rear direction than the left side operation switch 46 illustrated in FIG. 3. For example, the left side operation switch 460 is disposed at a position that may be touched by the thumb of the left hand of the person of size AM50 (the 50th percentile of American adult males) when the person is seated on the driver seat 12A in any of the driving position and the relaxing position. The left side operation switch 460 is an example of the "operation switch" and the "second operation switch".

In this structure, the right side operation switch 440 and left side operation switch 460 shown in FIG. 14 are publicly known touch switches equipped with a fingerprint authentication function. For example, a driver registers the fingerprint of the thumb of their right hand in advance to enable operation of the right side operation switch 440 and registers the fingerprint of the thumb of their left hand in advance to enable operation of the left side operation switch 460. The determination ECU 50 accepts an operation by the driver when a fingerprint operating the switch matches a registered fingerprint. Therefore, accidental operations of the right side operation switch 440 and left side operation switch 460 by the elbows, knees and the like of a driver may be suppressed while operability of the right side operation switch 440 and left side operation switch 460 is improved in states in which the driver seat 12A is in either of the driving position and the relaxing position.

The fingerprint authentication function is not limited to being equipped only at the right side operation switch 440 and left side operation switch 460 illustrated in FIG. 14. The right side operation switch 44 and left side operation switch 46 of the exemplary embodiments described above may be equipped with the fingerprint authentication function.

In the exemplary embodiments described above, the operation surface 44A of the right side operation switch 44 and the operation surface of the left side operation switch 46 may be made different in feel from the door trim side face 96 and the center console side face 86. Hence, when a driver attempts to press the right side operation switch 44 or left side operation switch 46 by feel, the right side operation switch 44 or left side operation switch 46 may be pressed easily without being looked at because of the difference in feel. For this structure, publicly known methods may be suitably employed as machining methods for the operation surface 44A and the operation surface of the left side operation switch 46 and for the door trim side face 96 and the center console side face 86.

In the exemplary embodiments described above, the precondition for satisfying the cancellation condition is that an autonomous lane change is being implemented, but this is not limiting. For example, times during suggestion of an autonomous lane change may be added to this precondition. In this case, when the determination ECU 50 acquires suggestion information, the determination ECU 50 determines that an autonomous lane change is being suggested. In a state in which the precondition that an autonomous lane change is being suggested is satisfied, the determination ECU 50 determines that the cancellation condition is satisfied both when operation information indicating that the right side operation switch 44 or left side operation switch 46 has been successively pressed at least a predetermined number of times or held pressed for at least a predetermined duration is acquired and also when operation information corresponding to the acquired suggestion information is not acquired within a predetermined duration.

In the exemplary embodiments described above, operation details of operation by the driver of the right side operation switch 44 or left side operation switch 46 to satisfy the cancellation condition are not limited to successively pressing at least a predetermined number of times or holding pressed for at least a predetermined duration. For example, the operation details may be that the switch capable of instructing a lane change to the lane at the opposite side from the lane to which the autonomous lane change is being conducted is pressed once. More specifically, when the lane to which the autonomous lane change is being conducted is a right lane and operation information indicating that the left side operation switch 46 has been pressed once is acquired, the determination ECU 50 determines that the operation details are satisfied and the cancellation condition is satisfied. Further, the determination ECU 50 may determine that the cancellation condition is satisfied in accordance with operation of alternative on-board equipment rather than being limited to operation of the right side operation switch 44 or left side operation switch 46. For example, the determination ECU 50 may determine that the operation details are satisfied and the cancellation condition is satisfied when a predetermined operation indicating an intention to cause the vehicle 10 to move to the opposite side from the lane to which an autonomous lane change is being conducted is carried out on the steering wheel 70 or a turn lever.

In the exemplary embodiments described above, a publicly known body pressure distribution sensor may be provided at the driver seat 12A. In this structure, the determination ECU 50 may determine whether or not to accept an operation of the right side operation switch 44 or left side operation switch 46 in accordance with a body pressure distribution of a driver measured by the body pressure distribution sensor. For example, when there is a predetermined offset in the body pressure distribution of the driver, the determination ECU 50 need not accept an operation of the right side operation switch 44 or left side operation switch 46. Thus, starting an autonomous lane change may be suppressed when, for example, the right side operation switch 44 or left side operation switch 46 is accidentally operated by a knee of the driver while the body pressure distribution of the driver has the predetermined offset.

In the exemplary embodiments described above, the display 32 acquiring the suggestion information may display supplementary information representing an in-vehicle switch, to prompt the user to operate the switch. For example, as the supplementary information, the display 32 may display an image of the in-vehicle switch, a position of the switch in the vehicle or the like.

In the exemplary embodiments described above, accidental operation of the right side operation switch 44 or left side operation switch 46 may be suppressed by making push strokes for making the right side operation switch 44 and left side operation switch 46 conductive longer. For example, a push stroke longer than a stroke that may be pressed by an elbow or knee of a driver is desirable.

In the exemplary embodiment described above, the right side operation switch 44 is disposed at the door trim side face 96 and the left side operation switch 46 is disposed at the center console side face 86. That is, in the exemplary embodiments described above, only one operation switch capable of instructing control of at least one of an autonomous driving function and a driving assistance function of the vehicle 10 is disposed at each of the door trim side face 96 and the center console side face 86, but this is not limiting. plural operation switches may be disposed at one or both of the door trim side face 96 and the center console side face 86. These structures are described using FIG. 15A and FIG. 15B.

Figure 15A:
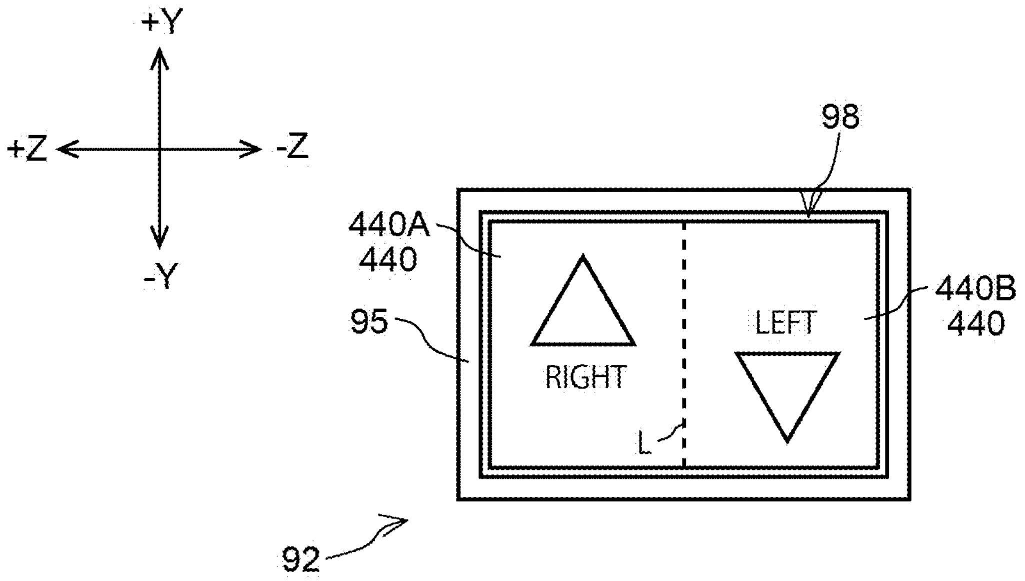
FIG. 15A is a first schematic view describing an alternative structure of the right side operation switch.

FIG. 15A is a first schematic view describing an alternative structure of the right side operation switch. The directions indicated by +Z, −Z, +Y and −Y in FIG. 15A are the same as in FIG. 3.

As shown in FIG. 15A, the right side operation switch 440 is mounted at the aperture 98 formed in the door trim side face 96 of the door trim 92 (see FIG. 3). The right side operation switch 440 is a publicly known touch switch equipped with the fingerprint authentication function.

This right side operation switch 440 is provided with an operation surface 440A, which is provided at a front side relative to a center line L depicted as a broken line, and an operation surface 440B, which is provided at the rear side relative to the center line L. As an example, the right side operation switch 440 is capable of instructing a lane change of the vehicle 10 to a right lane during autonomous driving when a driver operates the operation surface 440A and is capable of instructing a lane change of the vehicle 10 to a left lane during autonomous driving when the driver operates the operation surface 440B. Details of the instructions implemented by operations of the operation surface 440A and operation surface 440B may be reversed between left and right.

The protruding portion 95 is disposed at the periphery of the right side operation switch 440. The protruding portion 95 protrudes to the side at which the driver is disposed relative to the operation surface 440A and the operation surface 440B, specifically to the left side. The protruding portion 95 need not be disposed as in FIG. 15A.

Figure 15B:
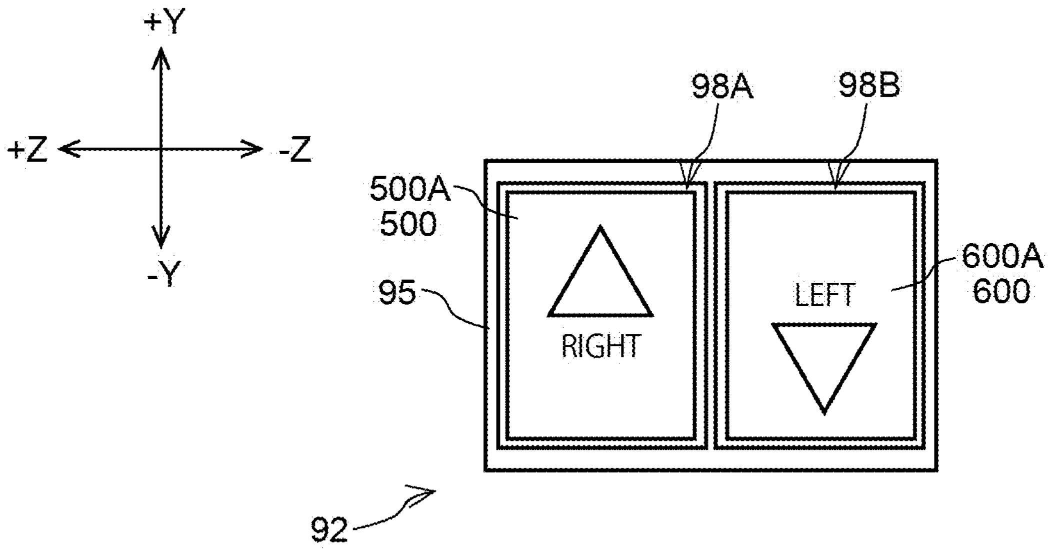
FIG. 15B is a second schematic view describing an alternative structure of the right side operation switch.

FIG. 15B is a second schematic view describing an alternative structure of the right side operation switch. The directions indicated by +Z, −Z, +Y and −Y in FIG. 15B are the same as in FIG. 3.

As shown in FIG. 15B, a first right side operation switch 500 is mounted at an aperture 98A formed in the door trim side face 96 of the door trim 92 (see FIG. 3), and a second right side operation switch 600 is mounted at an aperture 98B that is formed adjacent to the aperture 98A in the door trim side face 96 of the door trim 92. The first right side operation switch 500 and second right side operation switch 600 are publicly known automatic return-type push-button switches. The first right side operation switch 500 is a structure that is pressed in to the right side when an operation surface 500A is pressed by a driver, and the second right side operation switch 600 is a structure that is pressed in to the right side when an operation surface 600A is pressed by the driver. As an example, the first right side operation switch 500 and second right side operation switch 600 are Form A contact push-button switches.

The first right side operation switch 500 is an in-vehicle switch that is capable of instructing a lane change of the vehicle 10 to a right lane during autonomous driving, and the second right side operation switch 600 is an in-vehicle switch that is capable of instructing a lane change of the vehicle 10 to a left lane during autonomous driving. Details of the instructions implemented by operations of the first right side operation switch 500 and second right side operation switch 600 may be reversed between left and right.

The protruding portion 95 is disposed at the peripheries of the first right side operation switch 500 and the second right side operation switch 600. These protruding portions 95 protrude to the side at which the driver is disposed relative to the operation surface 500A and operation surface 600A, specifically to the left side. The protruding portion 95 need not be disposed as in FIG. 15B.

In the descriptions above, examples are described in which plural operation switches capable of instructing control of at least one of an autonomous driving function and a driving assistance function of the vehicle 10 are disposed at the door trim side face 96. These operation switches may be plurally disposed at the center console side face 86 instead of or in addition to the door trim side face 96. In a structure in which plural operation switches are disposed at the door trim side face 96 and at the center console side face 86, similar functions may be assigned to the operation switches of the door trim side face 96 and the center console side face 86, or different functions may be assigned to the respective operation switches of the door trim side face 96 and the center console side face 86.

When the plural operation switches described above are disposed at one or both of the door trim side face 96 and the center console side face 86, functions assigned to these operation switches are not limited to the autonomous lane change function. For example, instead of the autonomous lane change function, the autonomous parking function and driving support functions (for example, ACC) mentioned above and the like may be assigned to the operation switches. Furthermore, when the vehicle 10 is equipped with plural autonomous driving functions and driving support functions, it may be made possible for the driver to arbitrarily select functions to assign to these operation switches. For example, the driver may assign arbitrary functions to the operation switches by operating the various switches 40 of the vehicle 10 or by instructing an external device that is capable of communicating with the vehicle 10.

The processing that, in the exemplary embodiments described above, is executed by the CPU 51 reading software (programs) may be executed by various kinds of processor other than a CPU. Examples of processors in these cases include a PLD (programmable logic device) in which a circuit configuration can be modified after manufacturing, such as an FPGA (field programmable gate array) or the like, a dedicated electronic circuit which is a processor with a circuit configuration that is specially designed to execute specific processing, such as an ASIC (application-specific integrated circuit) or the like, and so forth. The determination processing may be executed by one of these various kinds of processors, and may be executed by a combination of two or more processors of the same or different kinds (for example, plural FPGAs, a combination of a CPU with an FPGA, or the like). Hardware structures of these various kinds of processors are, to be more specific, electronic circuits combining circuit components such as semiconductor components and the like.

In the exemplary embodiments described above, modes are described in which the information processing program 52A is stored in advance (installed) at the ROM 52, the information processing program 62A is stored in advance at the ROM 62, and the information processing program 112A is stored in advance at the ROM 112, but this is not limiting. The information processing program 52A, information processing program 62A and information processing program 112A may be provided in modes of being stored on a non-transitory memory medium such as a CD-ROM (compact disc read-only memory), DVD-ROM (digital versatile disc read-only memory), USB (universal serial bus) memory or the like. Modes are also possible in which the information processing program 52A, information processing program 62A and information processing program 112A are downloaded from external equipment via a network.

What is claimed is:

1. An operation device for a vehicle, comprising a plurality of operation switches including a first operation switch being disposed laterally adjacent to a driver seat of the vehicle on a door trim so as to face the driver seat on a first side, a second operation switch disposed laterally adjacent to a driver seat of the vehicle on a center console so as to face the drive seat on a second side, the first and second operation switches being capable of instructing control of at least one of an autonomous driving function or driving assistance function of the vehicle in accordance with operation by a driver, wherein, the first operation switch disposed on one side of the driver seat, the first operation switch giving an instruction that causes the vehicle to move to a left or right lane in accordance with operation by the driver; and a second operation switch disposed on the other side of the driver seat, the second operation switch giving an instruction that causes the vehicle to move to an opposite lane from the first operation switch in accordance with operation by the driver.

2. The operation device for a vehicle according to claim 1, wherein the door trim and center console allow an arm of the driver to be rested thereon, and the first and second operation switches are disposed at a position of a hand of the driver in a front-and-rear direction of the driver.

3. A vehicle comprising:

the operation device for a vehicle according to claim 1, a first lamp being provided at the first operation switch and a second lamp being provided at the second operation switch, the first lamp being capable of illuminating in a predetermined light-emitting mode and the second lamp being capable of illuminating in a predetermined light-emitting mode;

a memory; and a processor connected to the memory, wherein the processor is configured to:

control the at least one of an autonomous driving function or driving assistance function of the vehicle; and illuminate the first lamp when suggesting a movement to the left or right lane, and illuminate the second lamp when suggesting a movement to the opposite lane suggested by the first lamp.

4. An operation processing method for a vehicle including:

an operation device for a vehicle capable of instructing control of at least one of an autonomous driving function or driving assistance function of the vehicle in accordance with operation by a driver, the device including:

a first operation switch being disposed laterally adjacent to a driver seat of the vehicle on a door trim so as to face the driver seat on a first side, a second operation switch disposed laterally adjacent to a driver seat of the vehicle on a center console so as to face the drive seat on a second side, the first and second operation switches being capable of instructing control of at least one of an autonomous driving function or driving assistance function of the vehicle in accordance with operation by a driver, wherein, the first operation switch disposed on one side of the driver seat, the first operation switch giving an instruction that causes the vehicle to move to a left or right lane in accordance with operation by the driver;

a second operation switch disposed on the other side of the driver seat, the second operation switch giving an instruction that causes the vehicle to move to an opposite lane from the first operation switch in accordance with operation by the driver;

a first lamp being provided at the first operation switch and a second lamp being provided at the second operation switch, the first lamp being capable of illuminating in a predetermined light-emitting mode and the second lamp being capable of illuminating in a predetermined light-emitting mode;

a memory; and a processor connected to the memory, the operation processing method executed by the processor, the operation processing method comprising:

controlling the at least one of an autonomous driving function or driving assistance function of the vehicle; and illuminating the first lamp when suggesting a movement to the left or right, and illuminating the second lamp when suggesting a movement to the opposite direction of movement from the movement suggested by the first lamp.

5. A non-transitory memory medium storing a program executable by a processor to perform operation processing for a vehicle including:

an operation device for a vehicle capable of instructing control of at least one of an autonomous driving function or driving assistance function of the vehicle in accordance with operation by a driver, the operation switch including:

the first operation switch disposed on one side of the driver seat, the first operation switch giving an instruction that causes the vehicle to move to a left or right lane in accordance with operation by the driver; and a second operation switch disposed on the other side of the driver seat, the second operation switch giving an instruction that causes the vehicle to move to an opposite lane from the first operation switch in accordance with operation by the driver, a first lamp being provided at the first operation switch and a second lamp being provided at the second operation switch, the first lamp being capable of illuminating in a predetermined light-emitting mode and the second lamp being capable of illuminating in a predetermined light-emitting mode;

a memory; and the processor that is connected to the memory, the operation processing comprising:

controlling the at least one of an autonomous driving function or driving assistance function of the vehicle; and illuminating the first lamp when suggesting a movement to the left or right, and illuminating the second lamp when suggesting a movement to the opposite direction of movement from the movement suggested by the first lamp.

6. The operation device for a vehicle according to claim 1, wherein the first operation switch is capable of instructing an autonomous lane change to a first traffic lane, and the second operation switch is capable of instructing an autonomous lane change to a second traffic lane.

7. The operation device for a vehicle according to claim 1, wherein an operation surface of each operation switch does not protrude from the dedicated surface in a non-conducting state.

8. The operation device for a vehicle according to claim 1, wherein each operation switch is equipped with a fingerprint authentication function.

9. The operation device for a vehicle according to claim 1, wherein the first operation switch is capable of instructing an autonomous parking function to park the vehicle in a parking space to one side of the vehicle, and the second operation switch is capable of instructing the autonomous parking function to park the vehicle in a parking space to another side of the vehicle.

10. The vehicle according to claim 3, wherein the first lamp and the second lamp are full-color light-emitting diodes.

11. The vehicle according to claim 3, further comprising a lamp control unit configured to control illumination timings, illumination colors, and illumination durations of the first lamp and the second lamp.

* * * * *